(12) United States Patent
Okumura

(10) Patent No.: US 7,866,872 B2
(45) Date of Patent: Jan. 11, 2011

(54) LIGHT GUIDE PLATE, LIGHT GUIDE PLATE UNIT, AND PLANAR LIGHTING DEVICE

(75) Inventor: Takamitsu Okumura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 189 days.

(21) Appl. No.: 12/239,603

(22) Filed: Sep. 26, 2008

(65) Prior Publication Data
US 2009/0086506 A1   Apr. 2, 2009

(30) Foreign Application Priority Data
Sep. 28, 2007   (JP) .............................. 2007-256628

(51) Int. Cl.
*F21V 7/04* (2006.01)
(52) U.S. Cl. .......................... 362/628; 362/615; 349/65
(58) Field of Classification Search ................. 362/330, 362/97, 34, 615, 616, 619, 623, 625, 628, 362/606; 349/65, 69, 70, 71
See application file for complete search history.

(56) References Cited

U.S. PATENT DOCUMENTS

| 5,627,426 | A | * | 5/1997 | Whitman et al. ............. 313/116 |
| 5,723,937 | A | * | 3/1998 | Whitman et al. ............. 313/116 |
| 6,241,358 | B1 | | 6/2001 | Higuchi et al. |
| 6,464,367 | B2 | | 10/2002 | Ito et al. |
| 7,140,763 | B1 | * | 11/2006 | Keith-Wolfe ................. 362/628 |
| 7,244,059 | B2 | * | 7/2007 | Onishi ......................... 362/628 |
| 2002/0114148 | A1 | * | 8/2002 | Flohr et al. .................... 362/31 |
| 2004/0076010 | A1 | * | 4/2004 | Kuo ............................. 362/332 |
| 2004/0114343 | A1 | * | 6/2004 | Ho ................................. 362/31 |
| 2007/0183137 | A1 | * | 8/2007 | Iwasaki ........................ 362/97 |
| 2008/0112153 | A1 | * | 5/2008 | Iwasaki et al. ................. 362/84 |

FOREIGN PATENT DOCUMENTS

| JP | 02-208631 A | 8/1990 |
| JP | 05-4133 U | 1/1993 |
| JP | 11-288611 A | 10/1999 |
| JP | 2001-312916 A | 11/2001 |

* cited by examiner

*Primary Examiner*—Sandra L O Shea
*Assistant Examiner*—Danielle Allen
(74) *Attorney, Agent, or Firm*—Sughrue Mion, PLLC

(57) ABSTRACT

The light guide plate includes a light exit plane, two light entrance planes, two symmetrical inclined rear planes increasingly distanced from the light exit plane from the two light entrance planes toward a center of the light exit plane, a curved portion joining the two inclined rear planes and scattering particles for scattering light travelling inside the light guide plate. The light guide plate satisfies given ranges set for a length between the two light entrance planes, a thickness of each of the two light entrance planes, a thickness at the center of the curved portion, a radius of curvature thereof, tapers of the inclined rear planes, and a particle diameter and a density of the scattering particles, and conditions that a light use efficiency be 55% or greater and that a middle-high ratio represented by the brightness distribution at the light exit plane be greater than 0% and not greater than 25%.

20 Claims, 10 Drawing Sheets

LIGHT GUIDE PLATE, LIGHT GUIDE PLATE UNIT, AND PLANAR LIGHTING DEVICE

The entire contents of literature cited in this specification are incorporated herein by reference.

BACKGROUND OF THE INVENTION

The present invention relates to a light guide plate used in liquid crystal display devices and the like, a light guide plate unit using the light guide plate, and a planar lighting device using the light guide plate and the light guide plate unit.

Liquid crystal display devices use a backlight unit for radiating light from behind the liquid crystal display panel to illuminate the liquid crystal display panel. A backlight unit is configured using a light guide plate for diffusing light emitted by an illuminating light source to irradiate the liquid crystal display panel and optical parts such as a prism sheet and a diffusion sheet for rendering the light emitted from the light guide plate uniform.

Currently, large liquid crystal televisions predominantly use a so-called direct illumination type backlight unit comprising a light guide plate disposed immediately above the illuminating light source (see, for example, JP 05-4133 U). This type of backlight unit comprises a plurality of cold cathode tubes serving as a light source provided behind the liquid crystal display panel whereas the inside of the backlight unit provides white reflection surfaces to ensure uniform light amount distribution and necessary brightness.

To achieve a uniform light amount distribution with a direct illumination type backlight unit, however, a thickness of about 30 mm in a direction perpendicular to the liquid crystal display panel is required, making further reduction of thickness difficult with the direct illumination type backlight unit.

Small liquid crystal monitors used in computers and the like, on the other hand, employ a backlight unit of a so-called side light type using a flat light guide plate to achieve smaller, thinner designs. Also proposed is a thin backlight unit of a type using a light guide plate of which the thickness decreases with the increasing distance from the light source such as, for example, a tandem type (see, for example, JP 02-208631 A, JP 11-288611 A, and JP 2001-312916 A).

SUMMARY OF THE INVENTION

While a thin design may be achieved with backlight units such as the tandem type, of which the thickness decreases with the increasing distance from the light source, those backlight units yielded lower light use efficiency than the direct illumination type because of the relative dimensions of the cold cathode tube to the reflector. Further, where the light guide plate used is shaped to have grooves for receiving cold cathode tubes, although such a light guide plate could be shaped to have a thickness that decreases with the increasing distance from the cold cathode tube, if the light guide plate is made thinner, brightness at locations immediately above the cold cathode tube disposed in the grooves increased, thus causing uneven brightness on the light exit plane to stand out. In addition, all these light guide plates posed further problems: complex configurations leading to increased machining costs. Thus, a light guide plate of any of such types adapted to be used for a backlight unit for a large liquid crystal television having a screen size of say 37 inches or larger, in particular 50 inches or larger, was considerably expensive.

On the other hand, the side light type backlight unit using a flat light guide plate contains fine scattering particles dispersed therein in order to efficiently emit admitted light through the light exit plane. Although such a flat light guide plate may be capable of securing a light use efficiency of 83% at a particle density of 0.30 wt %, its brightness dropped in an area about the center as illustrated by the illuminance distribution indicated by a solid line in FIG. 9 when it was adapted to provide a larger screen despite scattering particles evenly dispersed therein, thus allowing uneven brightness to stand out to a visible level.

To even out such uneven brightness, the density of the scattering particles needed to be reduced in order to increase the amount of light leaking from the forward end, thus reducing the light use efficiency and the brightness. For example, when the density of the scattering particles was 0.10 wt %, with the other conditions being equal, the brightness decreased and the light use efficiency lowered to 43%, although uneven brightness could be evened out considerably, as illustrated by a dotted line in FIG. 9.

Further, large displays such as large liquid crystal televisions are required to provide a type of brightness distribution representing a high-in-the-middle curve as exemplified by a bell curve, whereby an area close to the center of the screen is brighter than the periphery thereof. However, a flat light guide plate containing scattering particles dispersed therein fails to achieve a high-in-the-middle brightness distribution, although reducing the density of its scattering particles may provide a flat brightness distribution.

It has also been proposed to use a light guide plate having a thickness that, conversely as compared with the tandem type, increases with the increasing distance from the light source for a thin backlight unit. Although use of such a light guide plate does achieve a thinner design and a flat brightness over the whole screen, such a proposal did not provide any teaching or did not give the slightest consideration as to how one may achieve a high-in-the-middle brightness distribution whereby an area close to the center of the screen is brighter than the periphery thereof as required of thin, large-screen liquid crystal televisions.

It is an object of the invention to provide a light guide plate that solves the problems associated with the prior art mentioned above and which has a thin configuration, yields a high light use efficiency, emits light with minimized unevenness in brightness, and achieves a brightness distribution representing a high-in-the-middle curve or a bell curve, whereby an area close to the center of the screen is brighter than the periphery thereof as required of thin, large-screen liquid crystal televisions, a light guide plate unit using the light guide plate, and a planar lighting device using the light guide plate and the light guide plate unit.

To solve the above problems, a first aspect of the invention provides a light guide plate comprising a light exit plane being flat and rectangular; two light entrance planes respectively containing two opposite longer sides of the light exit plane and disposed opposite each other; two inclined rear planes being symmetrical and increasingly distanced from the light exit plane from the two light entrance planes toward a center of the light exit plane; a curved portion joining the two inclined rear planes; and scattering particles for scattering light travelling inside the light guide plate contained in the light guide plate, wherein a light guiding length between the two light entrance planes ranges from 480 mm to 500 mm both inclusive, wherein a particle diameter of the scattering particles ranges from 4.0 µm to 12.0 µm both inclusive and a particle density of the scattering particles ranges from 0.02 wt % to 0.22 wt % both inclusive; wherein the particle diameter and the particle density of the scattering particles are within an area determined by six points (4.0,0.02), (4.0,0.085), (7.0, 0.03), (7.0,0.12), (12.0,0.06), and (12.0,0.22) in a graph where a horizontal axis indicates the particle diameter [μm] of the scattering particles and a vertical axis indicates the particle density [wt %] of the scattering particles; wherein a light use efficiency indicating a ratio of light emitted through the light exit plane to light admitted through the two light entrance planes is 55% or greater; and wherein a middle-high ratio represented by a brightness distribution at the light exit plane indicating a ratio of brightness of light emitted from an area about a center of the light exit plane to the brightness of light emitted at areas of the light exit plane close to the light entrance planes is above 0% and not greater than 25%.

To solve the above problems, a second aspect of the invention provides a light guide plate comprising: a light exit plane being flat and rectangular; two light entrance planes respectively containing two opposite longer sides of the light exit plane and disposed opposite each other; two inclined rear planes being symmetrical and increasingly distanced from the light exit plane from the two light entrance planes toward a center of the light exit plane; a curved portion joining the two inclined rear planes; and scattering particles for scattering light travelling inside the light guide plate contained in the light guide plate, wherein a light guiding length between the two light entrance planes ranges from 515 mm to 620 mm both inclusive, wherein a particle diameter of the scattering particles ranges from 4.0 μm to 12.0 μm both inclusive and a particle density of the scattering particles ranges from 0.015 wt % to 0.16 wt % both inclusive; wherein the particle diameter and the particle density of the scattering particles are within an area determined by six points (4.0,0.015), (4.0, 0.065), (7.0,0.02), (7.0,0.09), (12.0,0.035), and (12.0,0.16) in a graph where a horizontal axis indicates the particle diameter [μm] of the scattering particles and a vertical axis indicates the particle density [wt %] of the scattering particles; wherein a light use efficiency indicating a ratio of light emitted through the light exit plane to light admitted through the two light entrance planes is 55% or greater; and wherein a middle-high ratio represented by a brightness distribution at the light exit plane indicating a ratio of brightness of light emitted from an area about a center of the light exit plane to the brightness of light emitted at areas of the light exit plane close to the light entrance planes is above 0% and not greater than 25%.

To solve the above problems, a third aspect of the invention provides a light guide plate comprising a light exit plane being flat and rectangular; two light entrance planes respectively containing two opposite longer sides of the light exit plane and disposed opposite each other; two inclined rear planes being symmetrical and increasingly distanced from the light exit plane from the two light entrance planes toward a center of the light exit plane; a curved portion joining the two inclined rear planes; and scattering particles for scattering light travelling inside the light guide plate contained in the light guide plate, wherein a light guiding length between the two light entrance planes ranges from 625 mm to 770 mm both inclusive, wherein a particle diameter of the scattering particles ranges from 4.0 μm to 12.0 μm both inclusive and a particle density of the scattering particles ranges from 0.01 wt % to 0.12 wt % both inclusive; wherein the particle diameter and the particle density of the scattering particles are within an area determined by six points (4.0,0.01), (4.0,0.05), (7.0, 0.01), (7.0,0.06), (12.0,0.02), and (12.0,0.12) in a graph where a horizontal axis indicates the particle diameter [μm] of the scattering particles and a vertical axis indicates the particle density [wt %] of the scattering particles; wherein a light use efficiency indicating a ratio of light emitted through the light exit plane to light admitted through the two light entrance planes is 55% or greater; and wherein a middle-high ratio represented by a brightness distribution at the light exit plane indicating a ratio of brightness of light emitted from an area about a center of the light exit plane to the brightness of light emitted at areas of the light exit plane close to the light entrance planes is above 0% and not greater than 25%.

To solve the above problems, a fourth aspect of the invention provides a light guide plate comprising a light exit plane being flat and rectangular; two light entrance planes respectively containing two opposite longer sides of the light exit plane and disposed opposite each other; two inclined rear planes being symmetrical and increasingly distanced from the light exit plane from the two light entrance planes toward a center of the light exit plane; a curved portion joining the two inclined rear planes; and scattering particles for scattering light travelling inside the light guide plate contained in the light guide plate, wherein a light guiding length between the two light entrance planes ranges from 785 mm to 830 mm both inclusive, wherein a particle diameter of the scattering particles ranges from 4.0 μm to 12.0 μm both inclusive and a particle density of the scattering particles ranges from 0.008 wt % to 0.08 wt % both inclusive; wherein the particle diameter and the particle density of the scattering particles are within an area determined by six points (4.0,0.008), (4.0, 0.03), (7.0,0.009), (7.0,0.04), (12.0,0.02), and (12.0,0.08) in a graph where a horizontal axis indicates the particle diameter [μm] of the scattering particles and a vertical axis indicates the particle density [wt %] of the scattering particles; wherein a light use efficiency indicating a ratio of light emitted through the light exit plane to light admitted through the two light entrance planes is 55% or greater; and wherein a middle-high ratio represented by a brightness distribution at the light exit plane indicating a ratio of brightness of light emitted from an area about a center of the light exit plane to the brightness of light emitted at areas of the light exit plane close to the light entrance planes is above 0% and not greater than 25%.

Preferably, the thickness that is a distance from the light exit plane in a direction perpendicular to the light exit plane is 0.5 mm to 3.0 mm both inclusive at the light exit planes where the thickness is smallest, wherein the thickness is 1.0 mm to 6.0 mm both inclusive at a center of the curved portion where the thickness is greatest, wherein a radius of curvature of the curved portion is 6,000 mm to 45,000 mm both inclusive, and wherein a taper of the inclined rear planes is 0.1° to 0.8° both inclusive.

Preferably, the light entrance planes each have a surface roughness of less than 380 nm.

To solve the above problems, a fifth aspect of the invention provides a light guide plate unit comprising a light guide plate according to any one of the above aspects and an optical member unit provided closer to the light exit plane of the light guide plate and including at least one diffusion film having a diffusion function of admitting and diffusing light emitted through the light exit plane.

Preferably, the optical member unit comprises three diffusion films that the at least one diffusion film includes and a polarization separator film having a polarized light separating function whereby light polarized in a given direction is separated from incoming light and transmitted, and wherein the three diffusion films and the polarization separator film are placed in layers in an order from the light exit plane of the light guide plate.

Alternatively, it is preferable that the optical member unit comprises a diffusion film that the at least one diffusion film includes; a prism sheet formed with a number of prisms extending parallel to a longitudinal direction of the light exit plane and juxtaposed perpendicular to the longitudinal direction of the light exit plane, with their vertexes each having an angle of 90° and facing in a direction opposite from the light guide plate; and a polarization separator film having a polarized light separating function whereby light polarized in a given direction is separated from incoming light and transmitted, and wherein the diffusion film, the prism sheet and the polarization separator film are placed in layers in an order from the light exit plane of the light guide plate.

Alternatively, it is preferable that the optical member unit comprises a first diffusion film that the at least one diffusion film includes; a prism sheet formed with a number of prisms extending parallel to a longitudinal direction of the light exit plane and juxtaposed perpendicular to the longitudinal direction of the light exit plane, with their vertexes each having an angle of 90° and facing in a direction opposite from the light guide plate; a second diffusion film that the at least one diffusion film includes; and a polarization separator film having a polarized light separating function whereby light polarized in a given direction is separated from incoming light and transmitted, and wherein the first diffusion film, the prism sheet, the second diffusion film and the polarization separator film are placed in layers in an order from the light exit plane of the light guide plate.

Alternatively, it is preferable that the optical member unit comprises a prism sheet formed with a number of prisms extending parallel to a longitudinal direction of the light exit plane and juxtaposed perpendicular to the longitudinal direction of the light exit plane, with their vertexes each having an angle of 60° and facing in a direction of the light guide plate; a diffusion film that the at least one diffusion film includes; and a polarization separator film having a polarized light separating function whereby light polarized in a given direction is separated from incoming light and transmitted, and wherein the prism sheet, the diffusion film and the polarization separator film are placed in layers in an order from the light exit plane of the light guide plate.

Alternatively, it is preferable that the optical member unit comprises a first diffusion film that the at least one diffusion film includes; a first prism sheet formed with a number of prisms extending parallel to a longitudinal direction of the light exit plane and juxtaposed perpendicular to the longitudinal direction of the light exit plane, with their vertexes each having an angle of 90° and facing in a direction opposite from the light guide plate; a second prism sheet formed with a number of prisms extending parallel to a longitudinal direction of the light exit plane and juxtaposed perpendicular to the longitudinal direction of the light exit plane, with their vertexes each having an angle of 90° and facing in a direction of the light guide plate; a second diffusion film that the at least one diffusion film includes; and a polarization separator film having a polarized light separating function whereby light polarized in a given direction is separated from incoming light and transmitted, and wherein the first diffusion film, the first prism sheet, the second prism sheet, the second diffusion film and the polarization separator film are placed in layers in an order from the light exit plane of the light guide plate.

Preferably, the light guide plate unit according to the above fifth aspect further comprises a reflection sheet disposed in contact with the two inclined rear planes and the curved portion of the light guide plate.

To solve the above problems, a sixth aspect of the invention provides a light guide plate unit comprising a light guide plate according to any one of the above aspects 1 to 4; and a reflection sheet disposed in contact with the two inclined rear planes and the curved portion of the light guide plate.

To solve the above problems, a seventh aspect of the invention provides a planar lighting device comprising a light guide plate according to any one of the above 1 to 4 or a light guide plate unit according to any one of aspects 5 and 6 and two light sources disposed opposite the two light entrance planes of the light guide plate, respectively.

Preferably, the planar lighting device further comprises a housing for supporting the light guide plate or the light guide plate and the reflection sheet from the inclined rear planes of the light guide plate; and a cushioning member disposed between the light guide plate and the housing or between the reflection sheet and the housing such that the cushioning member supports the light guide plate or the light guide plate and the reflection sheet and is supported by the housing.

Further, each of the light sources preferably comprise plural LED chips and a support for supporting the plural LED chips, and wherein the plural LED chips are arrayed on a plane of the support opposite to each of the two light entrance planes.

Preferably, each of the plural LED chips comprises an LED for emitting light having a blue wavelength and a yellow fluorescent substance disposed on a light exit surface of the LED.

Alternatively, it is preferable that each of the plural LED chips comprises an LED for emitting light having a blue wavelength, a red fluorescent substance disposed on a light exit surface of the LED, and a green fluorescent substance disposed on the light exit surface of the LED.

Alternatively, it is preferable that each of the plural LED chips comprises an LED for emitting light having a blue wavelength an LED for emitting light having a green wavelength, and an LED for emitting light having a red wavelength.

The distance between the LEDs and the light emission planes of the respective light entrance planes are in a range of 0.2 mm to 0.5 mm both inclusive.

The first to sixth aspects of the invention produce effects that make it possible to provide a light guide plate and a light guide plate unit that has a thin configuration, yield a high light use efficiency, emits light with minimized unevenness in brightness, and achieve a brightness distribution representing a high-in-the-middle curve or a bell curve, whereby an area close to the center of the screen is brighter than the periphery thereof as required of thin, large-screen liquid crystal televisions.

Further, the seventh aspect of the invention produces effects that make it possible to provide a planar lighting device can be provided that is thin, yields a high light use efficiency, emits light with minimized unevenness in brightness, and achieves a brightness distribution representing a high-in-the-middle curve or a bell curve, whereby an area close to the center of the screen is brighter than the periphery thereof as required by thin, large-screen liquid crystal televisions.

BRIEF DESCRIPTION OF THE DRAWINGS

These and other objects, features, and advantages of the present invention will be apparent from the following detailed description and accompanying drawings in which.

DETAILED DESCRIPTION OF THE INVENTION

Now, a light guide plate, a light guide plate unit using the light guide plate, and a planar lighting device using the light guide plate and that light guide plate unit according to the invention will be described in detail referring to the preferred embodiments illustrated in the attached drawings.

Figure 1A:
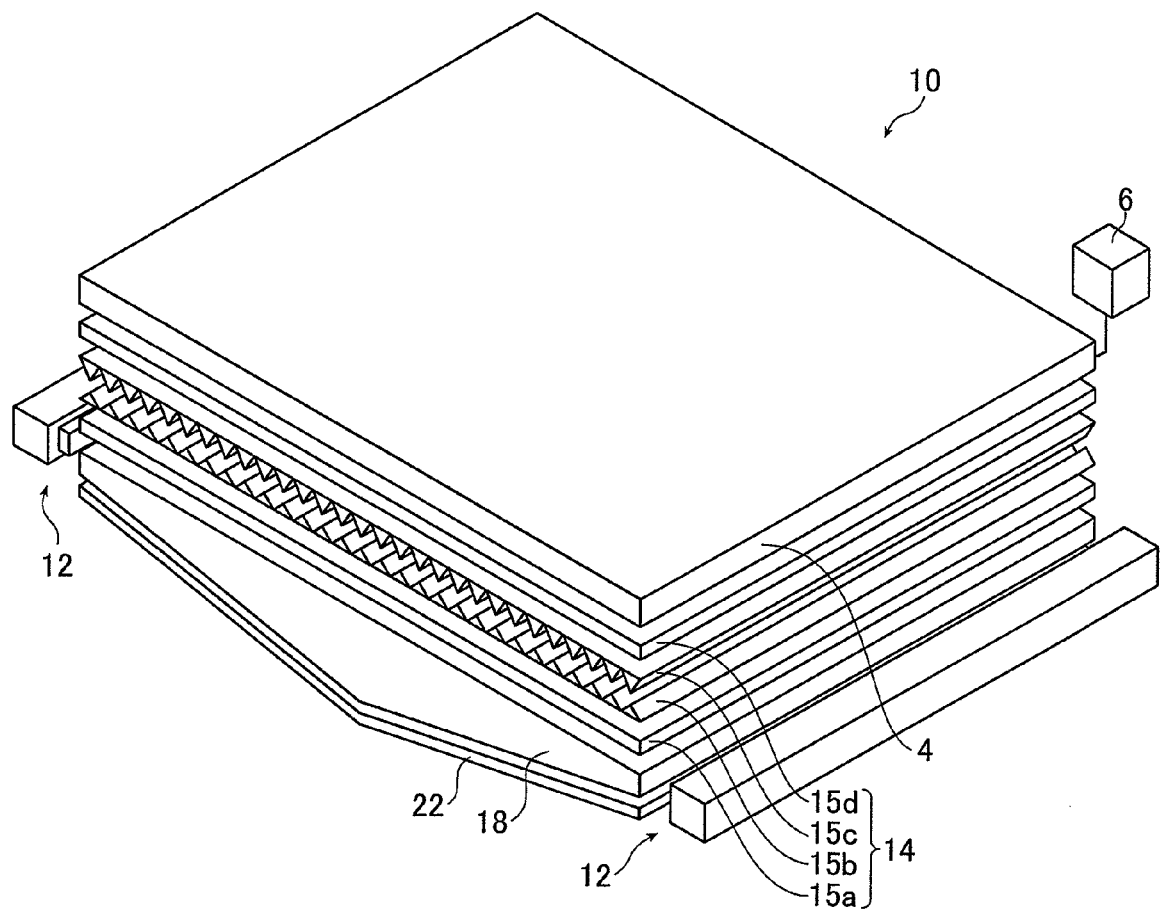
FIG. 1A is a schematic perspective view of a liquid crystal display device provided with the inventive planar lighting device.
Figure 1B:
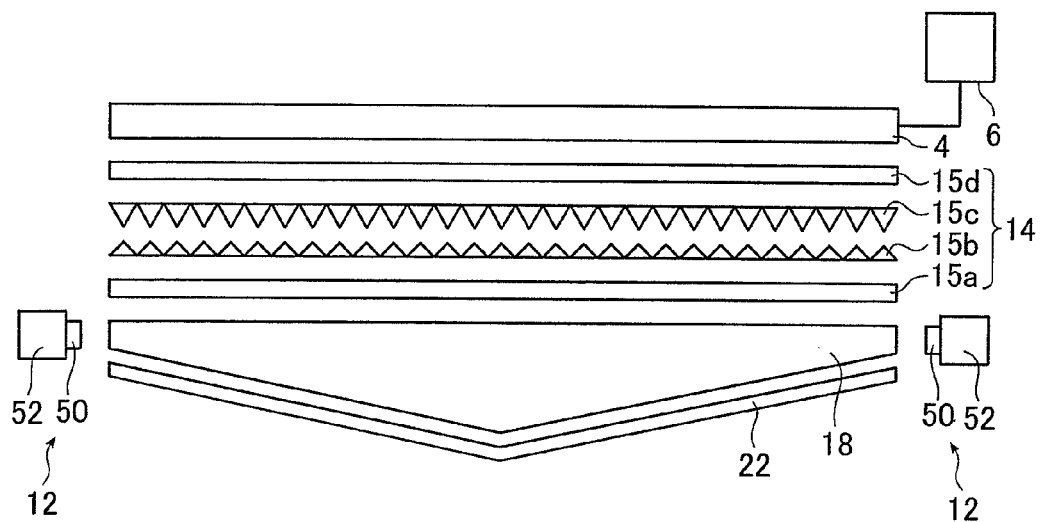
FIG. 1B is a schematic sectional view thereof.
Figure 2A:
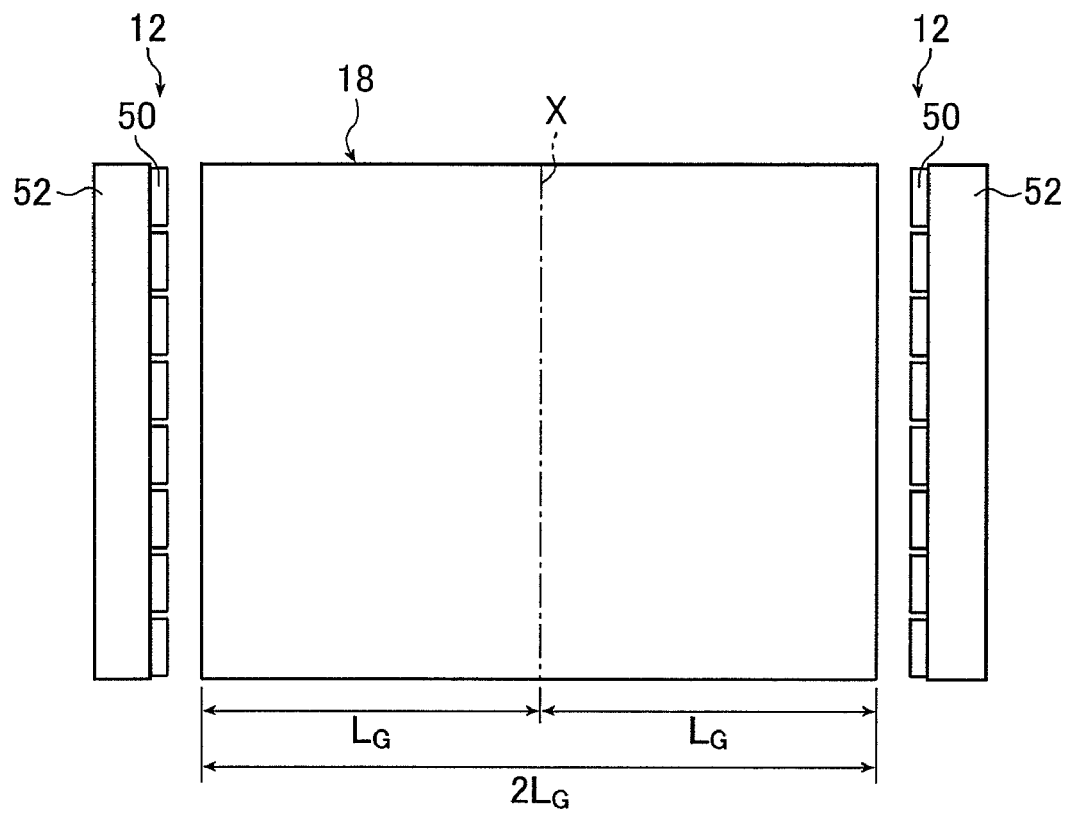
FIG. 2A is a schematic plan view of a light guide plate and light sources used in the inventive planar lighting device.
Figure 2B:
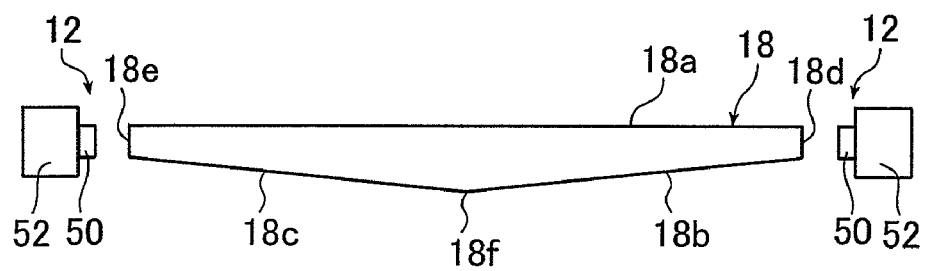
FIG. 2B is a schematic sectional view thereof.

FIG. 1A is a schematic perspective view of a liquid crystal display device using the inventive planar lighting device provided with the inventive light guide plate as a backlight; FIG. 1B is a schematic sectional view of the liquid crystal display device. FIG. 2A is a schematic plan view of the light guide plate and the light sources of the invention; FIG. 2B is a schematic sectional view of the light guide plate of the invention.

A liquid crystal display device 10 comprises a backlight unit 2, a liquid crystal display panel 4 disposed on the side of the backlight unit closer to the light exit plane thereof, and a drive unit 6 for driving the liquid crystal display panel 4.

In the liquid crystal display panel 4, electric field is partially applied to liquid crystal molecules previously arranged in a given direction to change the orientation of the molecules. The resultant changes in refractive index in the liquid crystal cells are used to display characters, figures, images, etc., on the liquid crystal display panel 4.

The liquid crystal display panel 4 for which the inventive light guide plate is intended has a screen size of 37 inches or larger and is used for large, thin liquid crystal televisions having such a large screen. The liquid crystal display panel 4 typically measures, for example, 37 inches, 42 inches, 46 inches, 52 inches, 57 inches and 65 inches.

The drive unit 6 applies a voltage to the transparent electrodes provided inside the liquid crystal display panel 4 to control the transmittance of the light allowed to pass through the liquid crystal display panel 4 by changing the orientation of the liquid crystal molecules.

The backlight unit 2 is the inventive planar lighting device for illuminating the whole surface of the liquid crystal display panel 4 from behind the liquid crystal display panel 4 and comprises a light exit plane having substantially the same shape as the image display plane of the liquid crystal display panel 4.

As illustrated in FIGS. 2A, 2B and FIGS. 2A, 2B, the backlight unit 2 comprises two light sources 12, an optical member unit 14, the inventive light guide plate 18, and a reflection sheet 22. The inventive light guide plate 18, the optical member unit 14 and/or the reflection sheet 22 form the light guide plate unit of the invention.

Now, the components forming the backlight unit 2 will be described below.

First, the light sources 12 will be described.

Figure 3A:
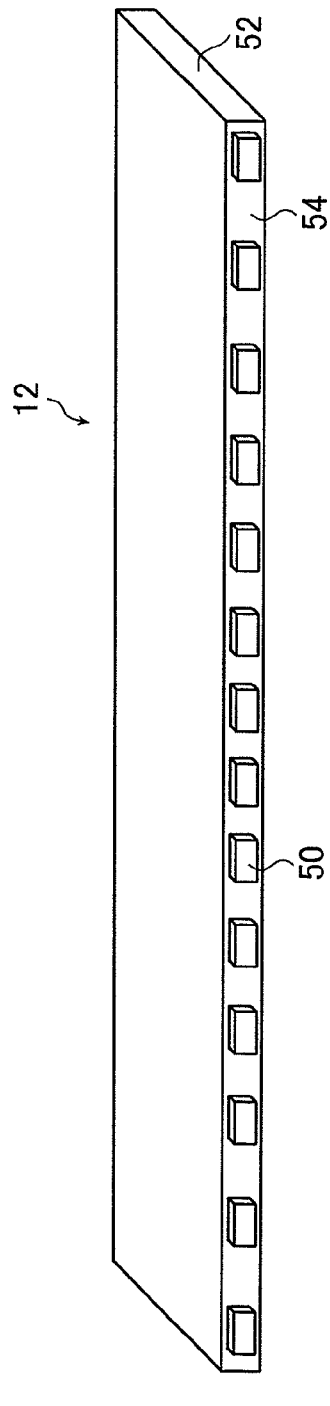
FIG. 3A is a perspective view illustrating an example of the light source used in the planar lighting device of FIGS. 1 and 2.
Figure 3B:
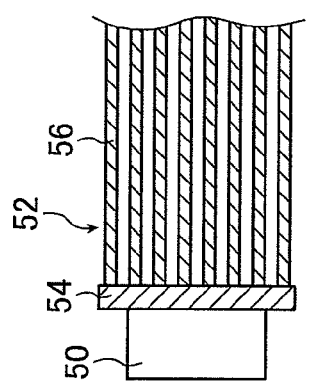
FIG. 3B is a cross sectional view of the light source of FIG.

FIG. 3A is a schematic perspective view illustrating a configuration of the light source 12 of the backlight unit 2 of FIGS. 1 and 2; FIG. 3B is a cross sectional view of the light source 12 illustrated in FIG. 3A; and FIG. 3C is a schematic perspective view illustrating as enlarged only one LED (light emitting diode) chip of the light source 12 of FIG. 3A.

As illustrated in FIG. 3A, the light source 12 comprises arrayed light emitting diode (LED) chips 50 and a light source mount 52.

Figure 3C:
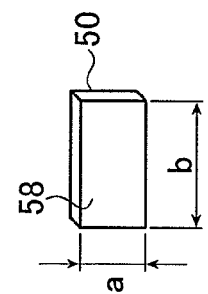
FIG. 3C is a schematic perspective view illustrating one LED of the light source of FIG. 3A as enlarged.

The LED chip 50 is a chip of a light emitting diode emitting blue light the surface of which has a fluorescent substance applied thereto as illustrated in FIG. 3C. It has a light emission face 58 having a given area through which white light is emitted.

Specifically, when blue light emitted through the surface of the light emitting diode of the LED chip 50 is transmitted through the fluorescent substance, the fluorescent substance generates fluorescence. Thus, when blue light emitted by the LED chip 50 is transmitted through the fluorescent substance, the blue light emitted by the light emitting diode and the light radiated as the fluorescent substance generates fluorescence blend to produce and emit white light.

Each LED chip 50 may for example be formed by applying a YAG (yttrium aluminum garnet) base fluorescent substance to the surface of a GaN base light emitting diode, an InGaN base light emitting diode, etc.

As illustrated in FIG. 3B, the light source mount 52 is a support for supporting plural LED chips, and comprises an array base 54 and fins 56. The LED chips 50 described above are arranged in a single row on the array base 54 at given intervals. Specifically, the LED chips 50 constituting each light source 12 are arrayed and secured to the array base 54 along the length of a first light entrance plane 18d and a second light entrance plane 18e to be described of the light guide plate 18, that is, parallel to a line in which the first light entrance plane 18d or the second light entrance plane 18e meets with a light exit plane 18a and secured to the array base 54.

The array base 54 is a plate member disposed such that one surface thereof faces a lateral end face of the light guide plate 18 where the light guide plate is thinnest, i.e., the first light entrance plane 18d or the second light entrance plane 18e of the light guide plate 18. The LED chips 50 are carried on a lateral plane of the array base 54 facing the light entrance plane 18d or 18e of the light guide plate 18.

The array base 54 according to the embodiment under discussion is formed of a metal having a good heat conductance as exemplified by copper and aluminum. The array base 54 also acts as a heat sink to absorb heat generated by the LED chips 50 and releases the heat to the outside.

The fins 56 are plate members each formed of a metal having a good heat conductance as exemplified by copper and aluminum. The fins 56 are connected to the array base 54 on the side thereof opposite from the LED chips 50 and spaced a given distance from neighboring fins 56.

A plurality of fins 56 provided in the light source mount 52 secure a large surface area and a high heat dissipation efficiency, increasing the efficiency with which the LED chips 50 are cooled.

While the embodiment under discussion uses the array base 54 of the light source mount 52 as heat sink, a plate member without a heat-releasing function may be used, where the LED chips need not be cooled, to form the array base in place of the array base having a function of a heat sink.

As illustrated in FIG. 3C, the LED chips 50 of the embodiment under discussion each have a rectangular shape such that the sides perpendicular to the direction in which the LED chips 50 are arrayed are shorter than the sides lying in the direction in which the LED chips 50 are arrayed or, in other words, the sides lying in the direction of thickness of the light guide plate 18 to be described, i.e., in the direction perpendicular to the light exit plane 18a, are the shorter sides. Expressed otherwise, the LED chips 50 each have a shape defined by b>a where "a" denotes the length of the sides perpendicular to the light exit plane 18a of the light guide plate 18 and "b" denotes the length of the sides in the array direction. Now, let "q" be the distance by which the arrayed LED chips 50 are spaced apart from each other, then q>b holds. Thus, the length "a" of the sides of the LED chips 50 perpendicular to the light exit plane 18a of the light guide plate 18, the length "b" of the sides in the array direction, and the distance "q" by which the arrayed LED chips 50 are spaced apart from each other preferably have a relationship satisfying q>b>a.

Providing the LED chips 50 each having the shape of a rectangle allows a thinner design of the light source and generation of a large amount of light. A thinner light source, in turn, permits a thinner design of the planar lighting device. Further, the number of LED chips that need to be arranged may be reduced.

While the LED chips 50 each preferably have a rectangular shape with the shorter sides lying in the direction of the thickness of the light guide plate 18 to achieve a thinner design of the light source, the present invention is not limited thereto, allowing the LED chips to have any shape as appropriate such as a square, a circle, a polygon, and an ellipse.

While the LED chips, arranged in a single row, has a monolayered structure in the embodiment under discussion, the present invention is not limited thereto; one may use multilayered LED arrays for the light source comprising LED arrays each carrying LED chips 50 on the array base 54. Where the LEDs are thus stacked, more LED arrays can be stacked when the LED chips 50 are each adapted to have a rectangular shape and when the LED arrays are each adapted to have a reduced thickness. Where the LED arrays are stacked to form a multilayer structure to provide more LED arrays (LED chips) in a given space, a greater amount of light can be generated. Preferably, the above expression also applies to the distance separating the LED chips of an LED array from the LED chips of the LED arrays in adjacent layers. Expressed otherwise, the LED arrays preferably are stacked such that the LED chips are spaced a given distance apart from the LED chips of the LED arrays in adjacent layers.

Next, the light guide plate 18 of the invention will be described referring to FIGS. 2A, 2B, 4A and 4B.

As illustrated in FIGS. 2A, 2B, 4A and 4B, the light guide plate 18 of the invention comprises a flat, a substantially rectangular light exit plane 18a, two inclined planes (a first inclined plane 18b and a second inclined plane 18c) located on the opposite side from the light exit plane 18a and inclined a given angle with respect to the light exit plane 18a to have a given taper in such a manner as to be symmetrical to each other with respect to a bisector X parallel to one side of the light exit plane 18a and bisecting the light exit plane 18a, two light entrance planes (a first light entrance plane 18d and a second light entrance plane 18e) disposed opposite the two LED arrays and admitting light emitted by the LED arrays, and a curved portion 18f having a radius of curvature R and formed at a joint between the first inclined plane 18b and the second inclined plane 18c.

The two light entrance planes 18d and 18e are located opposite each other adjacent the opposite longer sides of the substantially rectangular light exit plane 18a, respectively. The light emitted from the LED arrays disposed opposite each other and admitted through the two light entrance planes 18d and 18e travels inside the light guide plate 18 parallel to the opposite shorter sides of the substantially rectangular light exit plane 18a.

The first inclined plane 18b and the second inclined plane 18c are axisymmetrical with respect to the bisector X and symmetrically inclined with respect to the light exit plane 18a. The curved portion 18f is also axisymmetrically curved with respect to the bisector X. The light guide plate 18 grows thicker with the increasing distance from the first light entrance plane 18d and the second light entrance plane 18e toward the center such that the light guide plate 18 is thickest ($t_{max}$) in a position thereof corresponding to the central bisector X, i.e., in the middle of the curved portion 18f and thinnest ($t_{min}$) at the two light entrance planes (the first light entrance plane 18d and the second light entrance plane 18e) on both ends.

Thus, the light guide plate has a cross section axisymmetrical with respect to the central axis passing through the bisector X thereof.

In the present invention, a light guiding length L that the light travels between the first light entrance plane 18d and the second light entrance plane 18e needs to be 480 mm or greater since the liquid crystal display panel 4 for which the inventive light guide plate is intended has a screen size of 37 inches at minimum and needs to be 830 mm or less since the liquid crystal display panel 4 for which the inventive light guide plate is intended has a screen size of 65 inches at maximum. More specifically, it is preferable that the light guiding length L measures 480 mm to 500 mm both inclusive for a screen size of 37 inches, 515 mm to 620 mm both inclusive for screen sizes of 42 inches and 46 inches, 625 mm to 770 mm both inclusive for screen sizes of 52 inches and 57 inches, and 785 mm to 830 mm both inclusive for a screen size of 65 inches.

The minimum thickness $t_{min}$ of the light guide plate 18 at the light entrance planes 18d and 18e, where the light guide plate is thinnest, is preferably 0.5 mm to 3.0 mm both inclusive.

This is because if the minimum thickness is excessively small, the light entrance planes 18d and 18e are excessively small, and the amount of light admitted from the light sources 12 decreases, making the brightness of the light emitted through the light exit plane 18a insufficient, whereas if the minimum thickness is excessively great, the maximum thickness is excessively great, and the weight increases excessively, making the light guide plate unsuitable as an optical member of the liquid crystal display device and the like while failing to yield a light use efficiency of 55% or greater as the light is allowed to pass through the light guide plate.

The maximum thickness $t_{max}$ of the light guide plate 18 at the curved portion, where the light guide plate is thickest, is preferably 1.0 mm to 6.0 mm both inclusive.

This is because if the maximum thickness is excessively great, the weight increases excessively, making the light guide plate unsuitable as an optical member of the liquid crystal display device and the like while failing to yield a light use efficiency of 55% or greater as the light is allowed to pass through the light guide plate, whereas if the maximum thickness is excessively small, the curved portion 18f at the center has such a great radius of curvature R that it is unsuitable for molding and, as in the case of the flat light guide plate, a light use efficiency of 55% or greater is impossible to achieve at a particle density that permits a high-in-the-middle brightness distribution while, conversely, a high-in-the-middle distribution is impossible to achieve at a particle density that yields a light use efficiency of 55% or greater.

Accordingly, the inclination angle or the taper angle of the inclined rear planes 18b and 18c is preferably 0.1° to 0.8° both inclusive.

This is because if the taper angle is excessively great, the maximum thickness is greater than is necessary and the brightness exhibits an overly accentuated high-in-the-middle distribution curve, whereas if the taper angle is excessively small, as in the cases where the minimum thickness is excessively small, the curved portion at the center has such a great radius of curvature R that it is unsuitable for molding and, as in the case of the flat light guide plate, a high-in-the-middle distribution is impossible to achieve at a particle density that yields a light use efficiency of 55% or greater while, conversely, a light use efficiency of 55% or greater is impossible to achieve at a particle density that permits a high-in-the-middle brightness distribution.

Thus, the radius of curvature R of the curved portion 18f is preferably 6,000 mm to 45,000 mm both inclusive.

Figure 4A:
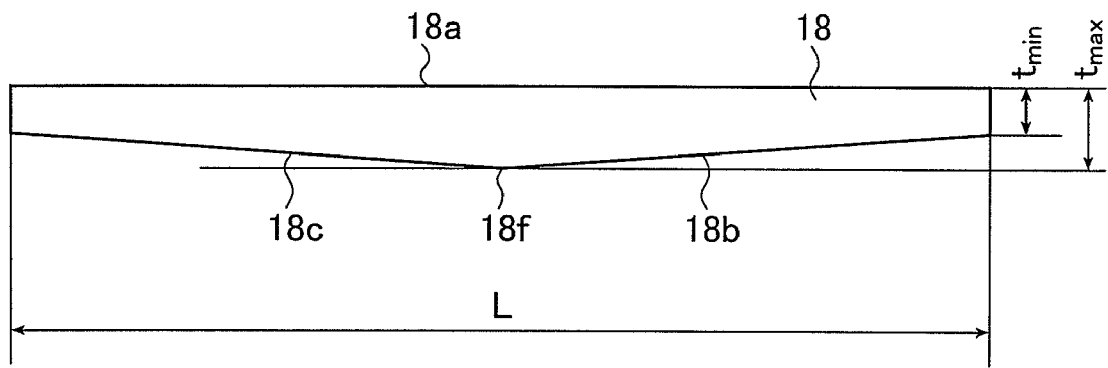
FIG. 4A is a schematic sectional view of the light guide plate of FIG. 2.
Figure 4B:
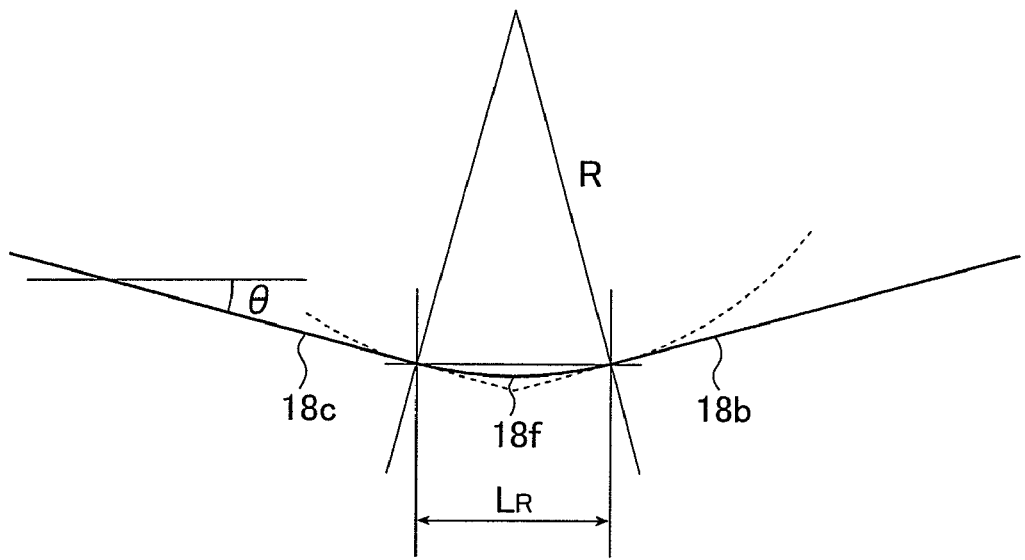
FIG. 4B is a sectional view illustrating the light guide plate of FIG. 4A partially enlarged.

Now, let θ be the taper angle of the inclined rear planes 18b and 18c as illustrated in FIGS. 4A and 4B. Then $L_R = 2R \sin\theta$, $t_{max}$ (the maximum thickness)$= t_{min} - [(L_R/2)\tan\theta + R\cos - R]$, and θ (taper angle)$= \tan^{-1}[(t_{max} - t_{min})/(L/2)]$ hold.

In the present invention, the light guide plate 18, shaped such that its thickness increases with the increasing distance from the first light entrance plane 18d and the second light entrance plane 18e toward the center thereof (the shape being referred to as "reversed wedge shape" below), makes it easier for the incoming light to travel still deeper into the light guide plate, thus improving the in-plane uniformity while maintaining the light use efficiency and further achieving a high-in-the-middle, bell-curve brightness distribution. In other words, such a shape achieves an even or a high-in-the-middle, bell-curve distribution where the conventional, flat light guide plate could only provide a distribution that is dark in the middle.

Further, a smooth joint achieved by providing the curved portion 18f between the inclined rear planes 18b and 18c eliminates a brightness line that would otherwise show along the central joint and enables an even or a high-in-the-middle, bell-curve distribution to be achieved.

In the light guide plate 18 illustrated in FIGS. 2A and 2B, light entering the light guide plate 18 through the first light entrance plane 18d and the second light entrance plane 18e is scattered as it travels through the inside of the light guide plate 18 by scattering particles contained inside the light guide plate 18 as will be described later in detail and, directly or after being reflected by the first inclined plane 18b or the second inclined plane 18c, exits through the light exit plane 18a. In the process, some light may leak through the first inclined plane 18b and the second inclined plane 18c. However, it is then reflected by the reflection sheet (not shown) provided in such a manner as to cover the first inclined plane 18b and the second inclined plane 18c to enter the light guide plate 18 again.

The light guide plate 18 is formed of a transparent resin into which fine scattering particles for scattering light are kneaded and dispersed. Transparent resin materials that may be used to form the light guide plate 18 include optically transparent resins such as PET (polyethylene terephthalate), PP (polypropylene), PC (polycarbonate), PMMA (polymethyl methacrylate), benzyl methacrylate, MS resins, and COP (cycloolefin polymer). The scattering particles kneaded and dispersed into the light guide plate 18 may be formed, for example, of TOSPEARL (trademark), silicone, silica, zirconia, or a derivative polymer. The light guide plate 18 containing the scattering particles is capable of emitting uniform illuminating light through the light exit plane with minimized unevenness in brightness.

The particle diameter of the scattering particles dispersed in the inventive light guide plate 18 needs to be 4.0 μm to 12.0 μm both inclusive because the scattering particles of a size selected within that range achieve a high scattering efficiency, has a great forward scattering property and a small wavelength dependency, and do not cause uneven color representation.

A suitable particle diameter for the scattering particles to be dispersed in the inventive light guide plate 18 is preferably determined considering the following in addition to the degree of wavelength dependency.

First of all, in a scattered light intensity distribution (angular distribution) of particles having a single particle diameter, a condition needs to be met that at least 90% of light is scattered within a forward angle of 0° to 5° because the inventive light guide plate 18 is required to guide light a distance of at least 240 mm from the first light entrance plane 18d and the second light entrance plane 18e when the light guide plate has a reversed wedge shape and at least 480 mm from the light entrance plane when light is admitted through one side of the light guide plate. If the light scattered within the forward angle of 0° to 5° fails to reach 90%, light cannot be guided deep enough into the light guide plate 18.

Thus, scattering particles having a particle diameter of less than 4.0 μm cause isotropic scattering and fail to meet the above condition. When an acrylic resin is used to provide a matrix and silicone resin is used to form particles, the particle diameter of the silicone resin scattering particles is preferably 4.5 μm or greater.

When the particle diameter of the scattering particles is greater than 12.0 μm, the forward scattering property of the particles intensifies so much that the mean free path within the system increases to reduce the number of scatterings, thus causing uneven brightness among the light source LEDs to show near the edges of the light exit plane near which light is admitted. Thus, the upper limit is set to 12.0 μm.

This is because when the particle density is excessively high, like phenomena result as in the case of the flat light guide plate and a high-in-the-middle brightness distribution cannot be achieved whereas when the particle density is excessively low, light is allowed to pass through, thus failing to meet a light use efficiency of 55% or greater.

Thus, selection of an optimum particle diameter of the scattering particles within a particle range determined as mentioned above (combination of particle refractive index and matrix refractive index) enables emission of light free from uneven wavelengths.

While the above examples use scattering particles all having a single particle diameter, the present invention is not limited in this way and allows a mixed use of scattering particles having a plurality of particle diameters.

In view of the inventive light guide plate 18 having a light guiding length of 480 mm to 830 mm, the density of the scattering particles needs to be 0.008 wt % to 0.22 wt % both inclusive.

Specifically, where the light guiding length L is 480 mm L≦830 mm, the density of the scattering particles needs to be 0.02 wt % to 0.22 wt % both inclusive.

Where the light guiding length L of the light guide plate, adapted for a 37-inch screen, is 480 mm, and the particle diameter of the scattering particles is 4.5 μm, the density of the scattering particles is more preferably 0.02 wt % to 0.085 wt % both inclusive, and most preferably 0.047 wt %. Where the particle diameter of the scattering particles is 7.0 μm, the density of the scattering particles is more preferably 0.03 wt % to 0.12 wt % both inclusive, and most preferably 0.065 wt %. Where the particle diameter of the scattering particles is 12.0 μm, the density of the scattering particles is more preferably 0.06 wt % to 0.22 wt % both inclusive, and most preferably 0.122 wt %.

Where the light guiding length L is 515 mm L≦620 mm, the density of the scattering particles is preferably 0.015 wt % to 0.16 wt % both inclusive.

Where the light guiding length L of the light guide plate, adapted for a 42-inch screen, is 560 mm, and the particle diameter of the scattering particles is 4.5 μm, the density of the scattering particles is more preferably 0.015 wt % to 0.065 wt % both inclusive, and most preferably 0.035 wt %. Where the particle diameter of the scattering particles is 7.0 μm, the density of the scattering particles is more preferably 0.02 wt % to 0.09 wt % both inclusive, and most preferably 0.048 wt %. Where the particle diameter of the scattering particles is 12.0 μm, the density of the scattering particles is more preferably 0.04 wt % to 0.16 wt % both inclusive, and most preferably 0.09 wt %.

Where the light guiding length L of the light guide plate, adapted for a 46-inch screen, is 590 mm, and the particle diameter of the scattering particles is 4.5 μm, the density of the scattering particles is more preferably 0.015 wt % to 0.060 wt % both inclusive, and most preferably 0.031 wt %. Where the particle diameter of the scattering particles is 7.0 μm, the density of the scattering particles is more preferably 0.02 wt % to 0.08 wt % both inclusive, and most preferably 0.043 wt %. Where the particle diameter of the scattering particles is 12.0 μm, the density of the scattering particles is more preferably 0.035 wt % to 0.15 wt % both inclusive, and most preferably 0.081 wt %.

Where the light guiding length L is 625 mm L≦770 mm, the density of the scattering particles is preferably 0.01 wt % to 0.12 wt % both inclusive.

Where the light guiding length L of the light guide plate, adapted for a 52-inch screen, is 660 mm, and the particle diameter of the scattering particles is 4.5 μm, the density of the scattering particles is more preferably 0.010 wt % to 0.050 wt % both inclusive, and most preferably 0.025 wt %. Where the particle diameter of the scattering particles is 7.0 μm, the density of the scattering particles is more preferably 0.015 wt % to 0.060 wt % both inclusive, and most preferably 0.034 wt %. Where the particle diameter of the scattering particles is 12.0 μm, the density of the scattering particles is more preferably 0.030 wt % to 0.120 wt % both inclusive, and most preferably 0.064 wt %.

Where the light guiding length L of the light guide plate, adapted for a 57-inch screen, is 730 mm, and the particle diameter of the scattering particles is 4.5 μm, the density of the scattering particles is more preferably 0.010 wt % to 0.040 wt % both inclusive, and most preferably 0.021 wt %. Where the particle diameter of the scattering particles is 7.0 μm, the density of the scattering particles is more preferably 0.010 wt % to 0.050 wt % both inclusive, and most preferably 0.028 wt %. Where the particle diameter of the scattering particles is 12.0 μm, the density of the scattering particles is more preferably 0.020 wt % to 0.100 wt % both inclusive, and most preferably 0.053 wt %.

Where the light guiding length L is 785 mm L≦830 mm, the density of the scattering particles is preferably 0.006 wt % to 0.08 wt % both inclusive.

Where the light guiding length L of the light guide plate, adapted for a 65-inch screen, is 830 mm, and the particle diameter of the scattering particles is 4.5 μm, the density of the scattering particles is more preferably 0.008 wt % to 0.030 wt % both inclusive, and most preferably 0.016 wt %. Where the particle diameter of the scattering particles is 7.0 μm, the density of the scattering particles is more preferably 0.009 wt % to 0.040 wt % both inclusive, and most preferably 0.022 wt %. Where the particle diameter of the scattering particles is 12.0 μm, the density of the scattering particles is more preferably 0.020 wt % to 0.080 wt % both inclusive, and most preferably 0.041 wt %.

As will be apparent from the above, the particle diameter and the density of the scattering particles to be dispersed in the light guide plate 18 according to the light guiding length between the two light entrance planes 18d and 18e of the light guide plate need to meet a given relationship.

Figure 10A:
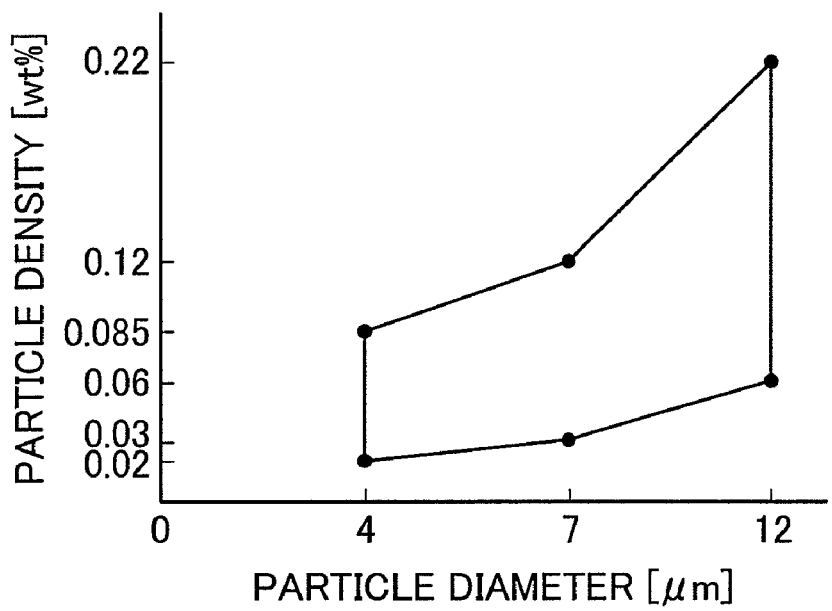
FIGS. 10A and 10B are graphs each illustrating a relationship between a particle diameter and a particle density (wt %) of the scattering particles dispersed in the inventive light guide plate.
Figure 10B:
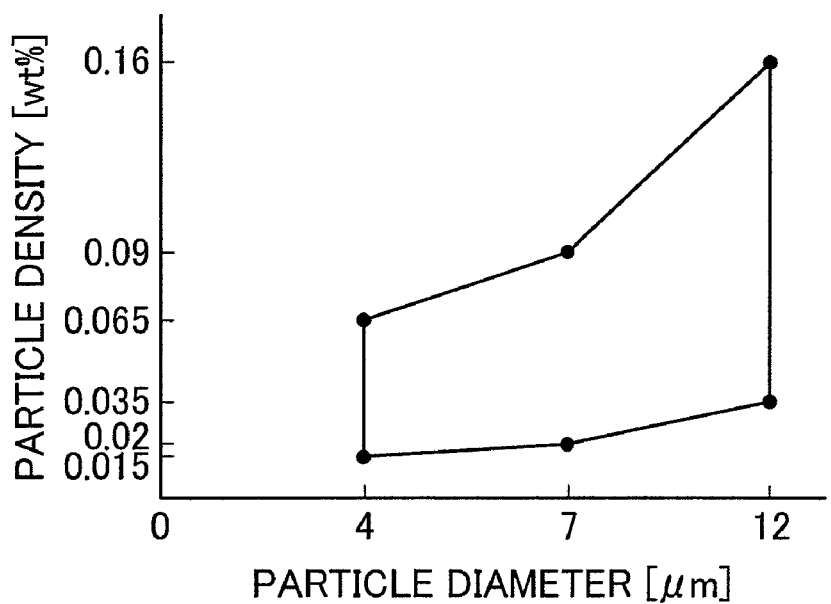
Figure 11A:
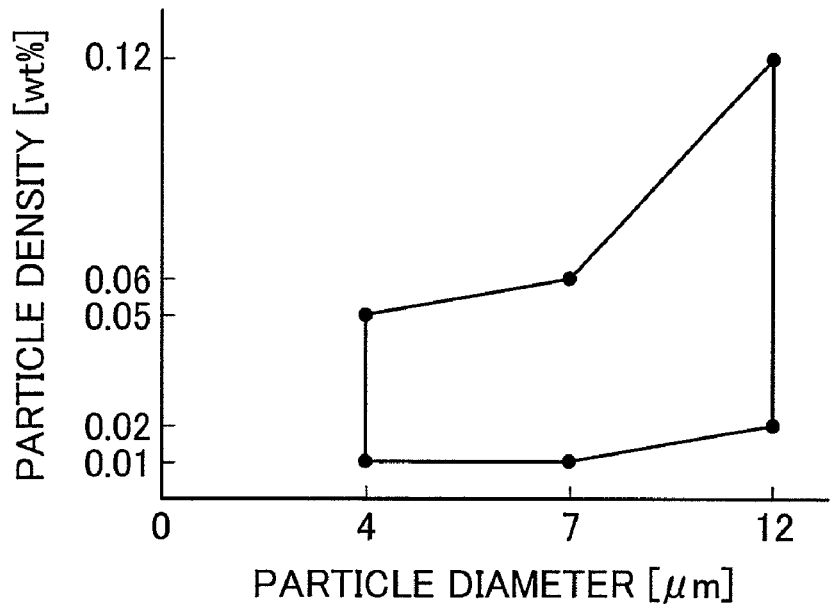
FIGS. 11A and 11B are graphs each illustrating a relationship between a particle diameter and a particle density (wt %) of the scattering particles dispersed in the inventive light guide plate.
Figure 11B:
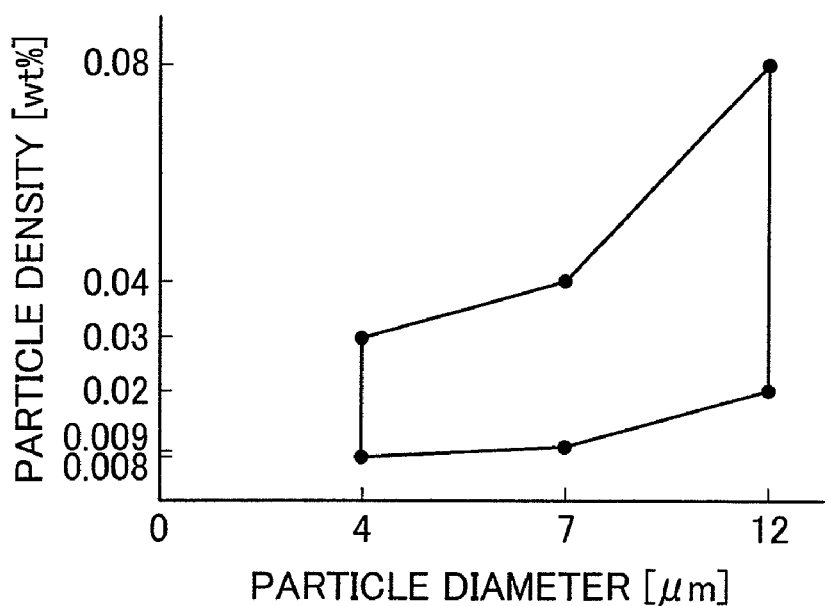

Thus, where, according to the invention, the light guiding length of the light guide plate 18 is 480 mm to 500 mm both inclusive, the particle diameter of the scattering particles needs to be 4.0 μm to 12.0 μm both inclusive, and the density of the scattering particles needs to be 0.02 wt % to 0.22 wt % both inclusive as described above. In addition, the particle diameter and the particle density of the scattering particles need to be in an area determined by six points (4.0,0.02), (4.0,0.085), (7.0,0.03), (7.0,0.12), (12.0,0.06), and (12.0,0.22) as illustrated in FIG. 10A, where the horizontal axis indicates the particle diameter (μm) of the scattering particles and the vertical axis indicates the particle density (W %) of the scattering particles.

Where the light guiding length of the light guide plate 18 is 515 mm to 620 mm both inclusive, the particle diameter of the scattering particles needs to be 4.0 μm to 12.0 μm both inclusive, and the density of the scattering particles needs to be 0.015 wt % to 0.16 wt % both inclusive as described above. In addition, the particle diameter and the particle density of the scattering particles need to be in an area determined by six points (4.0,0.015), (4.0,0.065), (7.0,0.02), (7.0,0.09), (12.0, 0.035), and (12.0,0.16) as illustrated in FIG. 10B, where the horizontal axis indicates the particle diameter (μm) of the scattering particles and the vertical axis indicates the particle density (W %) of the scattering particles.

Where the light guiding length of the light guide plate 18 is 625 mm to 770 mm or smaller, the particle diameter of the scattering particles needs to be 4.0 μm to 12.0 μm both inclusive, and the density of the scattering particles needs to be 0.01 wt % to 0.12 wt % both inclusive as described above. In addition, the particle diameter and the particle density of the scattering particles need to be in an area determined by six points (4.0,0.01), (4.0,0.05), (7.0,0.01), (7.0,0.06), (12.0,0.02), and (12.0,0.12) as illustrated in FIG. 11A, where the horizontal axis indicates the particle diameter (μm) of the scattering particles and the vertical axis indicates the particle density (W %) of the scattering particles.

Where the light guiding length of the light guide plate 18 is 785 mm to 830 mm both inclusive, the particle diameter of the scattering particles needs to be 4.0 μm to 12.0 μm both inclusive, and the density of the scattering particles needs to be 0.008 wt % to 0.08 wt % both inclusive as described above. In addition, the particle diameter and the particle density of the scattering particles need to be in an area determined by six points (4.0,0.008), (4.0,0.03), (7.0,0.009), (7.0,0.04), (12.0, 0.02), and (12.0,0.08) as illustrated in FIG. 11B, where the horizontal axis indicates the particle diameter (μm) of the scattering particles and the vertical axis indicates the particle density (W %) of the scattering particles.

The particle diameter and the particle density of the scattering particles need to be confined within an area determined by the six points illustrated in FIGS. 10A, 10B and 11A and 11B because a higher particle density outside the area fails to achieve a high-in-the-middle distribution as in the case of the flat light guide plate while a lower particle density outside the area fails to yield a light use efficiency of 55% or greater as light is allowed to pass through, whereas scattering particles having a smaller diameter outside the area improves the light use efficiency but fails to achieve a high-in-the-middle distribution while scattering particles having a greater diameter outside the area achieves a high-in-the-middle distribution but only yields a low light use efficiency.

Thus, selection of an appropriate particle density of the scattering particles from within a particle diameter range determined according to the invention as mentioned above enables emission of light with an increased light use efficiency as compared with cases where the scattering particles are dispersed in the flat light guide plate. The invention achieves a light use efficiency of at least 55%, specifically 70% or greater.

Thus, selection of an appropriate combination of particle diameter and particle density ensures that light from the LED light source is emitted from the light guide plate free from uneven brightness with a light mixing distance of about 10 mm.

The light guide plate 18 of the invention having scattering particles dispersed therein needs to meet a light use efficiency of at least 55%, the light use efficiency indicating a ratio of light emitted through the light exit plane to light admitted through the two light entrance planes. This is because under a light use efficiency of 55%, a light source capable of generating a greater output is needed to obtain a required brightness, and a light source capable of generating a greater output not only assumes a higher temperature and consumes a greater amount of electricity but causes the light guide plate 18 to warp or expand in a significant manner, making it impossible to achieve a required brightness distribution, i.e., a high-in-the-middle or bell-curve brightness distribution.

Further, the middle-high ratio represented by the brightness distribution as measured at the light exit plane indicating the ratio of brightness of the light emitted from an area about the center of the light exit plane to the brightness of the light emitted from areas of the light exit plane close to the light entrance planes needs to be 0% exclusive to 25% inclusive because a distribution meeting such a condition is the brightness distribution required of a thin, large-screen liquid crystal television, i.e., a high-in-the-middle, bell-curve distribution whereby an area closer to the center of the screen is bright as compared with the periphery thereof.

The light guide plate 18 having such a property may be manufactured by using an extrusion molding or an injection molding.

In the light guide plate 18, at least one surface of the first light entrance plane 18d and the second light entrance plane 18e, through which light is admitted, the light exit plane 18a, and the first inclined plane 18b and the second inclined plane 18c, which reflect light, preferably has a surface roughness Ra of less than 380 nm, thus, Ra<380 nm.

When the first light entrance plane 18d and the second light entrance plane 18e, through which light is admitted, each have a surface roughness Ra of less than 380 nm, diffuse reflection on the surfaces of the light entrance planes can be ignored or, in other words, diffuse reflection on the surfaces of the light entrance planes can be prevented and, thus, light admission efficiency can be improved.

Further, when the light exit plane 18a is given a surface roughness Ra of less than 380 nm, transmission by diffuse reflection through the surface of the light exit plane can be ignored or, in other words, transmission by diffuse reflection on the surface of the light exit plane can be prevented and, therefore, light is allowed to travel further deep into the light guide plate by total reflection.

Further, when the first inclined plane 18b and the second inclined plane 18c, both serving to reflect light, is given a surface roughness Ra of less than 380 nm, diffuse reflection can be ignored or, in other words, diffuse reflection on these reflective surfaces can be prevented and, therefore, all the reflected light components are allowed to travel further deep into the light guide plate.

The light guide plate of the invention, basically configured as described above, may be designed as follows.

Figure 5:
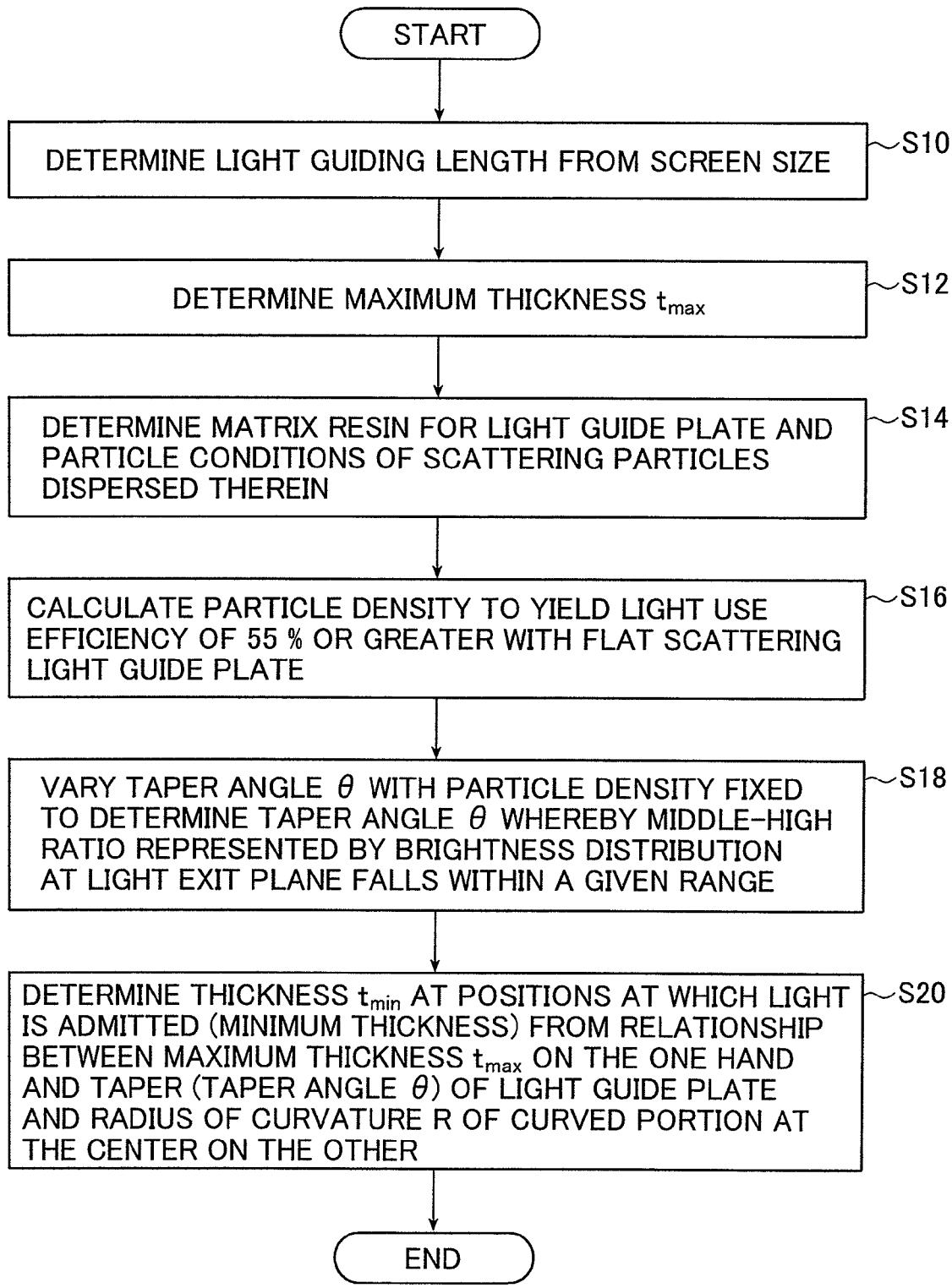
FIG. 5 is a flowchart illustrating an example of designing sequence for designing the light guide plate of the invention.

FIG. 5 is a flowchart illustrating an example of designing sequence for the light guide plate of the invention.

As illustrated in FIG. 5, a light guiding length is determined in Step 10 by adding a light mixing distance of about 10 mm to the length of the shorter side of the screen size of the liquid crystal display device to which the backlight unit using the inventive light guide plate is applied.

Next, a maximum thickness $t_{max}$ of the light guide plate is determined from the screen size in Step 12.

Then, a matrix resin used for the light guide plate and particle conditions of the added scattering particles are determined in Step 14.

Then, a particle density is determined in Step 16 that yields a light use efficiency of 55% or greater with the flat light guide plate containing scattering particles dispersed therein (dispersing light guide plate) and having the light guiding length determined earlier. The light use efficiency is expressed as E=Iout/Iin×100 [%], where Iout and Iin denote outgoing and incoming luminous fluxes [lm], respectively. While the particle density is determined by simulation, when there is a difference between a light use efficiency E as actually measured and a light use efficiency E as obtained by simulation, the design value of the particle density should be determined considering the difference. When there is such a difference, it is preferable to have previously found the difference between a light use efficiency E as actually measured and a light use efficiency E as obtained by simulation.

Next, in Step 18, the taper angle θ or the maximum thickness $t_{max}$ of the inclined rear planes (reversed wedge shape) of the inventive light guide plate is varied, with the design value of the particle density fixed, to obtain a brightness distribution at the light exit plane of the light guide plate and determine the taper angle θ whereby the middle-high ratio represented by the brightness distribution thus obtained falls within a given range. At this time, the radius of curvature R of the curved portion at the center is determined according to the light guiding length to match with the tapered planes. The middle-high ratio D is expressed as 0<D≦25, D=[($L_{cen}$−$L_{edg}$)/$L_{cen}$]× 100 [%]. The middle-high ratio D denotes a middle-high ratio represented by the brightness distribution (a degree to which the middle stands out), and $L_{cen}$ and $L_{edg}$ denote brightnesses as observed at about the center and at both sides of the screen (areas close to the entrance planes), respectively. While the taper angle θ is determined by simulation, when there is a difference between a particle density as actually measured and a particle density as obtained by simulation, the brightness distribution should be considered and the ratio D determined taking into account the difference to determine the taper angle θ. When there is such a difference, it is preferable to have previously found the difference between a particle density as actually measured and a particle density as obtained by simulation is preferably obtained.

Subsequently, in Step 20, a thickness at positions at which light is admitted (minimum thickness) $t_{min}$ is determined from the relationship between the maximum thickness of the light guide plate $t_{max}$ on the one hand and the taper (taper angle) and the radius of curvature R of the curved portion at the center on the other to select LEDs having a light emission face smaller than the thus determined thickness $t_{min}$ at positions at which light is admitted.

The light guide plate of the invention can be designed following the procedure described above.

Figure 6:
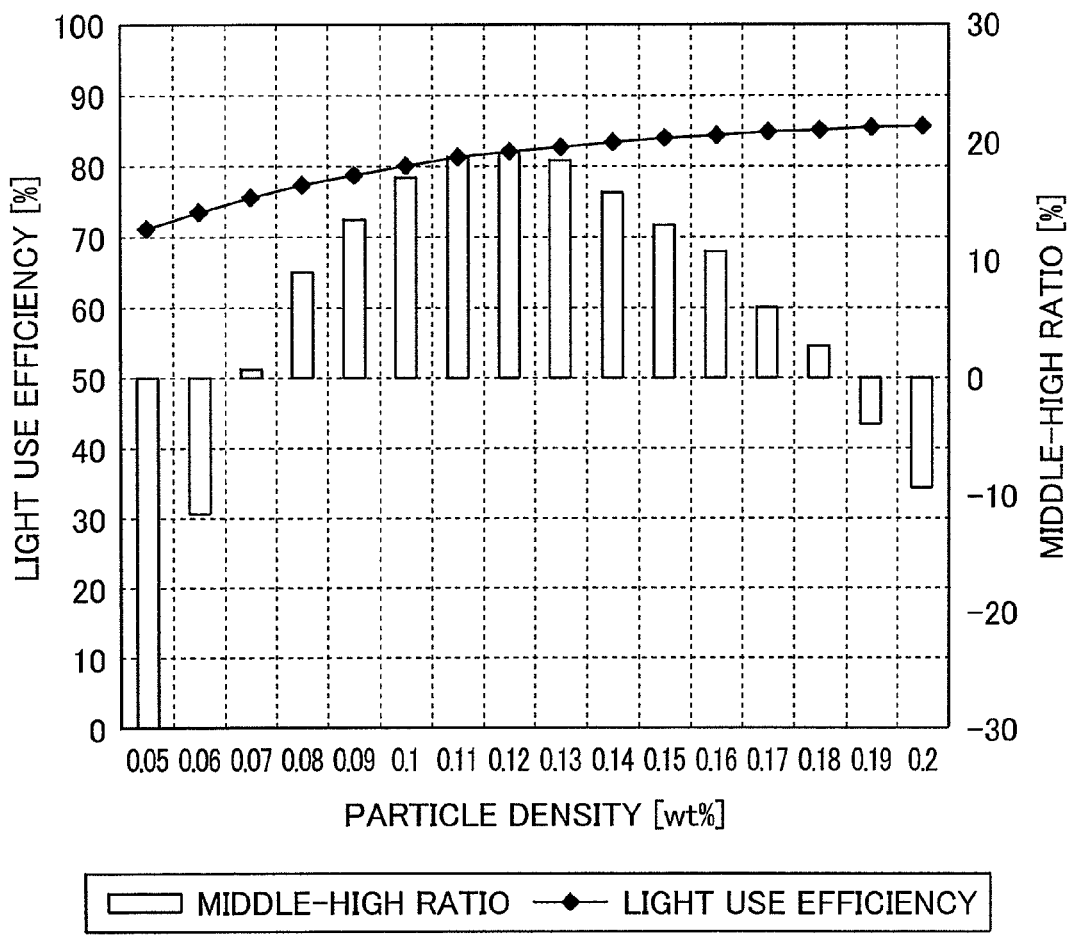
FIG. 6 is a graph illustrating a relationship between a density (wt %) of particles dispersed in the inventive light guide plate on the one hand and a light use efficiency (%) and a middle-high ratio on the other.

FIG. 6 illustrates a relationship between particle density [wt %] on the one hand and a light use efficiency [%] and the middle-high ratio [%] on the other in the case of a light guide plate used for a screen size of 37 inches and having a maximum thickness of 3.5 mm and a light guiding length of 480 mm.

As is apparent from FIG. 6, the light use efficiency is greater than 70% in a particle density range of 0.05 wt % to 0.2 wt % while the middle-high ratio is negative, indicating that the brightness distribution is low in the middle, in particle density ranges of 0.05 wt % to 0.07 wt % and 0.19 wt % to 0.2 wt %. It will be understood that when the middle-high ratio of 10% or greater is required, for example, design should be made such that the particle density falls within a range of 0.08 wt % to 0.16 wt %.

Table 1 shows light guiding length [mm], maximum thickness [mm], particle density [wt %], taper [degree], radius of curvature R of the central curved portion [mm], light use efficiency [%], and the middle-high ratio [%] of light guide plates designed as described above for screen sizes of 37 inches, 42 inches, 46 inches 52 inches, 57 inches, and 65 inches, respectively.

Any of the light guide plates given in Table 1, meeting the ranges as provided by the invention, is thin despite of its large screen, yields a high light use efficiency, emits light with minimized unevenness in brightness and achieves a high-in-the-middle or bell-curve distribution whereby an area about the center of the screen is brighter than the periphery, as is required of thin, large-screen liquid crystal televisions.

The light guide plate of the invention is basically configured as above.

Preferably, the light sources 12 and the light guide plate 18 are disposed such that the light emission faces of the light sources 12, for example the LED emission faces (surfaces), and the respective light entrance planes 18*d* and 18*e* of the light guide plate 18 are spaced by a distance of 0.2 mm or greater. In other words, it is preferable that the light emission faces of the light sources 12 and the light entrance planes of the light guide plate 18 are spaced by a distance of 0.2 mm or greater. This is because a space of 0.2 mm or greater provided therebetween prevents damage of the light sources 12 (specifically, the fluorescent substance on the surfaces of the LEDs) that might otherwise occur as expansion or warping of the light guide plate due to temperature variation should cause the light emission faces of the light sources 12 (specifically, the surfaces of the LEDs) and the light guide plate 18 to come into contact with each other. Preferably, such a space therebetween is 0.5 mm or less, to which the present invention is not limited, because an excessively great space reduces the amount of light from the light sources 12 that reaches the light entrance planes 18*d* and 18*e* of the light guide plate 18.

Description of the backlight unit illustrated in FIGS. 1 and 2 will now be resumed.

Now, the optical member unit 14 that may be preferably used in the present invention will be described.

The optical member unit 14 is disposed on the side of the light guide plate 19 on which the light exit plane 18*a* is located and comprises a diffusion film 15*a*, a first prism sheet 15*b*, a second prism sheet 15*c*, and a polarization separator film 15*d*, placed into layers in this order from the member closest to the light exit plane 18*a*.

First, the diffusion film 15*a* will be described.

As illustrated in FIG. 1, the diffusion film 15*a* is disposed between the light guide plate 18 and the polarization separa-

TABLE 1

| | Screen size | | | | | |
|---|---|---|---|---|---|---|
| | 37" | 42" | 46" | 52" | 57" | 65" |
| Light guiding length [mm] | 480 | 560 | 590 | 660 | 730 | 830 |
| Maximum thickness [mm] | 3.48 | 3.48 | 3.48 | 3.5 | 3.48 | 3.48 |
| Particle density [wt %] | 0.065 | 0.048 | 0.043 | 0.035 | 0.028 | 0.022 |
| Taper [deg.] | 0.477 | 0.411 | 0.390 | 0.351 | 0.317 | 0.279 |
| Radius of curvature R of central curved portion [mm] | 15000 | 20000 | 22000 | 28000 | 33000 | 42000 |
| Light use efficiency [%] | 61.5 | 61 | 61 | 60 | 61 | 59 |
| Middle-high ratio [%] | 19 | 15 | 14.5 | 14 | 14.2 | 13.5 | tor film 15*b*. The diffusion film 15*a* is formed by imparting a light diffusing property to a material in the form of film. The material in the form of film may be formed of an optically transparent resin such as PET (polyethylene terephthalate), PP (polypropylene), PC (polycarbonate), PMMA (polymethyl methacrylate), benzyl methacrylate, an MS resin, or COP (cycloolefin polymer).

The method of manufacturing the diffusion film 15*a* is not limited specifically. For example, a surface of the material in the form of film may be machined to form an asperity thereon or roughened by grinding thereby to provide a light diffusing property, or by coating the surface with a material that diffuses light as exemplified by silica; pigments such as titanium oxide and zinc oxide; a resin; and beads of glass, zirconia, etc., together with a binder, or by kneading the above pigments or beads having a light diffusing property into said transparent resin. Otherwise, one may also use a material having a high reflectance and a low light-absorbing property such as metals as exemplified by Ag and Al.

In the present invention, a diffusion film of a matte type or a coating type may be used as the diffusion film 15*a*.

The diffusion film 15*a* may be disposed a given distance apart from the light exit plane of the light guide plate 18. The distance may be altered as appropriate according to the light amount distribution of light emitted through the light exit plane of the light guide plate 18.

With the diffusion film 15*a* spaced a given distance apart from the light exit plane of the light guide plate 18, the light emitted from the light exit plane of the light guide plate 18 is further mixed (blended) between the light exit plane and the diffusion film 15*a*. This further enhances the uniformity of brightness of light transmitted through the diffusion film 15*a* to illuminate the liquid crystal display panel 4.

The diffusion film 15*a* may be spaced a given distance apart from the light exit plane of the light guide plate 18 using a method, for example, whereby spacers are provided between the diffusion film 15*a* and the light guide plate 18.

The first prism sheet 15*b* is a transparent film sheet formed by arranging a plurality of prisms in parallel as illustrated in FIGS. 1A and 1B and helps condense the light emitted through the light exit plane 18*a* of the light guide plate 18 to improve brightness. The first prism sheet 15*b* is disposed between the diffusion film 15*a* and the second prism sheet 15*c* such that the prism arrays or the vertexes of the prisms face the second prism sheet 15*c* as illustrated or face upwardly in the drawing. Preferably, the vertex of each prism of the first prism sheet 15*b* has an angle of 90°.

As illustrated in FIGS. 1A and 1B, the second prism sheet 15*c* is provided, as is the first prism sheet 15*b*, to help condense the light emitted through the light exit plane 18*a* of the light guide plate 18 to improve brightness and may be likewise formed by using a transparent film sheet formed by arranging thereon a plurality of prisms in parallel. The second prism sheet 15*c* is disposed between the first prism sheet 15*b* and the polarization separator film 15*d* such that, as in the illustrated example, the vertexes of the prisms face the light exit plane 18*a* of the light guide plate 18, or face downward in the drawing. Preferably, the vertex of each prism of the second prism sheet 15*c* has an angle of 60°.

Further, the first prism sheet 15*b* and the second prism sheet 15*c* are preferably disposed according to the invention as illustrated such that their prism arrays are parallel to the light entrance planes 18*d* and 18*e* of the light guide plate 18.

Next, the polarization separator film 15*d* will be described.

In the embodiment under discussion, the polarization separator film 15*d* is capable of selectively transmitting a given polarized component, e.g., p-polarized component, of light emitted through the light exit plane of the light guide plate and reflecting almost all of the other polarized components, e.g., s-polarized component. The polarization separator film 15*d* causes reflected light to reenter the light guide plate for reuse, which greatly increases light use efficiency and enhances brightness.

The polarization separator film 15*d* may for example be obtained by mixing, kneading, and dispersing acicular particles into a transparent resin and stretching a resultant sheet material to orient the acicular particles in a given direction. Further, the polarization separator film 15*d* may be a known polarization separator film.

Next, the reflection sheet 22 of the backlight unit will be described.

The reflection sheet 22 is provided to reflect light leaking through the inclined planes 18*b*, 18*c* and the curved portion 18*f* of the light guide plate 18 back into the light guide plate 18, thereby enhancing the light use efficiency. The reflection sheet 22 is bent at the middle thereof to cover the inclined planes 18*b*, 18*c* and the curved portion 18*f* of the light guide plate 18. Preferably, the reflection sheet 22 is integrated with the inclined planes 18*b*, 18*c* and the curved portion 18*f* of the light guide plate 18 by, for example, bonding or by application as a reflection sheet layer.

The reflection sheet 22 may be formed of any material that is capable of reflecting light leaking through the inclined planes 18*b*, 18*c* and the curved portion 18*f* of the light guide plate 18. It may be formed, for example, of a resin sheet formed by kneading PET, PP (polypropylene), etc. with a filler and then drawing a resultant mixture to form voids therein thereby to increase the reflectance; a sheet formed by depositing aluminum vapor or otherwise forming a specular surface on the surface of a transparent resin sheet or a white resin sheet; a metal foil such as an aluminum foil or a resin sheet carrying a metal foil; and a metal thin plate having sufficient reflective property on the surface.

While the backlight unit 2 has been described above in detail, the invention is not limited in any manner to the backlight unit as described.

For example, although each LED chip of the light sources is formed by applying a yellow (YAG) fluorescent substance to the light emission face of a blue LED that emits light having a blue wavelength, the LED chip may be formed otherwise without limitations to such a configuration. For example, one may use an LED chip formed by applying a red fluorescent substance or a green fluorescent substance to a blue LED. Alternatively, one may use an LED chip formed by applying a fluorescent substance to the light emission face of a monochromatic LED other than a blue LED such as a red LED emitting light having a red wavelength or a green LED emitting light having a green wavelength.

Alternatively, one may use an LED chip formed by applying a blue fluorescent substance, a red fluorescent substance, or a green fluorescent substance to the light emission face of an infrared LED emitting light having an infrared wavelength.

The fluorescent substance on the light emission face of each LED chip may be provided by methods including bonding in addition to application or alternatively, may be spaced a given distance from the light guide plate.

Further, an LED unit formed using three kinds of LEDs, i.e., a red LED, a green LED, and a blue LED, may be used to provide light source LED chips. In that case, light beams emitted by the three kinds of LEDs are blended to produce white light.

Alternatively, a semiconductor laser (LD) may be used instead of an LED.

The light source LED formed by applying a yellow fluorescent substance to the light emission face of a blue LED, which is a monochromatic LED, causes less uneven color representation attributable to temporal degradation or temperature variation, boasts the highest light emission efficiency among the light source LEDs mentioned above, and has much proven use for ease of commercial production. However, it does have disadvantages of a low color rendition and a narrow color reproduction range.

Among the light source LEDs mentioned above, the light source LED formed by applying a red fluorescent substance and a green fluorescent substance to the light emission face of a blue LED, which is a monochromatic LED, holds uneven color representation attributable to temporal degradation or temperature variation to a minimum level and capable of emitting light offering a relatively high color rendition, thus boasting a high color reproduction. However, it has a disadvantage of less commercial production than other light source LEDs.

The light source LED formed by applying a blue fluorescent substance, a red fluorescent substance and a green fluorescent substance to the light emission face of an infrared LED that emits light having an infrared wavelength, being a monochromatic LED, minimizes uneven color representation attributable to temporal degradation or temperature variation and causes the least uneven color representation attributable to temperature variation among the light source LEDs mentioned above but yields a lower light emission efficiency than other light source LEDs.

The LED light source using LED units each composed of three kinds of LEDs, a red LED, a green LED, and a blue LED, is capable of greatly enhanced color rendition and boasts the highest color rendition among the LED light sources mentioned above. The LED light source of this type, however, suffers from uneven color representation because of difficulty encountered in improving power efficiency of the green LEDs and therefore requires drive control.

Because of the variation in characteristics among the light source LEDs described above, LEDs best suited to the requirements should be selected for use.

Further, the backlight unit may be provided on the light emitting side thereof with a transmittance adjusting member having a function of ameliorating uneven brightness of light emitted through the light exit plane.

Figure 7:
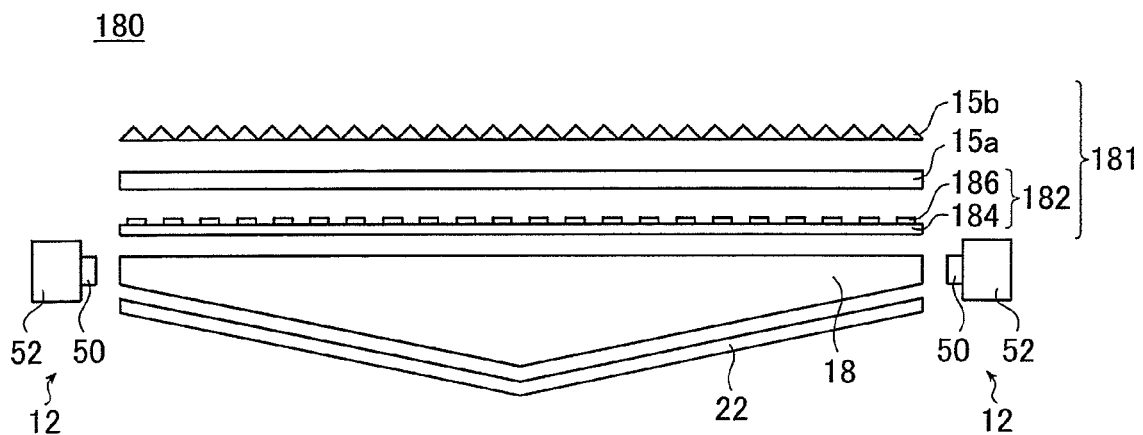
FIG. 7 is a schematic sectional view illustrating an example of backlight unit having a transmittance adjusting member.

FIG. 7 is a schematic sectional view of a backlight unit 180 provided with a transmittance adjusting member 182.

The backlight unit 180 comprises light sources 12, the optical member unit 181 composed of the diffusion film 15a, the first prism sheet 15b, and the transmittance adjusting member 182, the light guide plate 18, and the reflection sheet 22.

The backlight unit 180 illustrated in FIG. 7 has the same configuration as the backlight unit 2 illustrated in FIG. 1 except that the former uses an optical member unit 181 composed of the diffusion film 15a, the first prism sheet 15b, and the transmittance adjusting member 182 in place of the optical member unit 14 composed of the diffusion film 15a, the first prism sheet 15b, the second prism sheet 15c, and the polarization separator film 15d. Accordingly, like components share like reference characters between the two backlight units, and detailed description thereof will not be given here, focusing instead on the differences below.

The optical member unit 181 is disposed on the side of the light guide plate 18 on which the light exit plane 18a is located and comprises the transmittance adjusting member 182, the diffusion film 15a, and the prism sheet 15b, placed into layers in this order from the member closest to the light exit plane 18a. The diffusion film 15a has the same shape and function as the diffusion film 15a described earlier and so does the prism sheet 15b as the prism sheet 15b described earlier. The prism sheet 15b is formed thereon with prisms having the vertexes facing the liquid crystal display panel 4 or, described otherwise, having the bases parallel to the light exit plane 18a of the light guide plate 18.

As described above, the transmittance adjusting member 182 is used to ameliorate uneven brightness of light emitted from the light guide plate and comprises a transparent film 184 and numerous transmittance adjusters 186 arranged on the surface of the transparent film 184.

The transparent film 184 is in the form of a film and formed of optically transparent resins such as PET (polyethylene terephthalate), PP (polypropylene), PC (polycarbonate), PMMA (polymethyl methacrylate), benzyl methacrylate, MS resins, other acrylic resins or COP (cycloolefin polymer).

The transmittance adjusters 186 are dots of various sizes each having a given transmittance and have various shapes such as a rectangle, a circle, and a hexagon; the transmittance adjusters 186 are formed, by printing for example, on the whole surface of the transparent film 184 facing the light guide plate 18 in a given pattern, or in such a pattern, for example, that the sizes of dots or the number of dots vary according to the location (halftone dot pattern).

The transmittance adjusters 186 need only be diffusion reflectors and may, for example, be formed by applying a material that diffuses light as exemplified by silica; pigments such as titanium oxide and zinc oxide; a resin; and beads of glass, zirconia, etc., together with a binder, or may be a pattern created by machining a surface to form an asperity thereon or by grinding a surface to roughen the surface. Otherwise, one may use a material having a high reflectance and a low light-absorbing property such as metals as exemplified by Ag and Al.

One may also use ordinary white ink as used in screen printing, offset printing, etc. One may use, for example, ink obtained by dispersing titanium oxide, zinc oxide, zinc sulfate, barium sulfate, etc. into acrylic binder, polyester binder, vinyl chloride binder, etc.; or ink given a diffusing property by mixing titanium oxide with silica.

Numerous transmittance adjusters 186 are distributed on the surface of the transparent film 184 facing the light guide plate 18 in a given pattern such that the pattern density of the transmittance adjusters 186 varies according to the location on the surface.

Now, let $\rho(x, y)$ be the pattern density of the transmittance adjusting member 182 at a given position $(x, y)$ and $F(x, y)$ be the relative brightness of light emitted at a given position $(x, y)$ on the light exit plane of the backlight unit 180 (plane facing the liquid crystal display panel 4) having no transmittance adjusting member 182. Then the relationship between the pattern density $\rho(x, y)$ of the transmittance adjusting member 182 and the relative brightness $F(x, y)$ preferably satisfies the following expression.

$$\rho(x,y)=c\{F(x,y)-F_{min}\}/(F_{max}-F_{min})$$

In the above expression, $F_{max}$ denotes a maximum brightness, and $F_{min}$ denotes a minimum brightness, of light emitted through the light exit plane of the diffusion film 15a of the backlight unit 180 without the transmittance adjusting member 182. Note that the relative brightness $F(x, y)$ is determined with reference to the maximum brightness $F_{max}$ ($F_{max}=1$).

The value of "c," a maximum density, preferably satisfies $0.5 \leq c \leq 1$.

When the density of the distribution of the transmittance adjusters is designed according to the above expression, there may be cases where uneven brightness is visible depending on the angle of observation when the observation is made at an angle other than from the front. To remedy that, the calculated density distribution is complemented by a "uniform pattern distribution (bias density ρb)." This minimizes unevenness in brightness and eliminates or reduces angular dependence of uneven brightness.

The bias density ρb is preferably 0.01 to 1.50 (1% to 150). When the distribution density is greater than 1 (100%), the transmittance adjusters are provided in two layers. Specifically, transmittance adjusters having a distribution density of (ρb−1) are further disposed on the transmittance adjusters laid over the whole surface.

The pattern density ρ(x, y) denotes occupancy per unit area (1 mm$^2$) of the transmittance adjusters 186 at a given position (x, y). When ρ(x, y)=1, the transmittance adjusters 186 are provided over the whole surface within a unit area; when ρ(x, y)=0, no transmittance adjuster 186 is provided within a unit area.

The transmittance adjusters 186 of the transmittance adjusting member 182 so arranged as to satisfy the pattern density ρ(x, y) defined by the above expression limit the lowering of the average brightness of light emitted through the light exit plane of the backlight unit 180 and minimize unevenness in brightness. Where unevenness in brightness is thus reduced using the transmittance adjusting member 182, the diffusion film 15a is not required on its part to achieve thorough diffusion of light. As a result, the diffusion film 15a may be made thinner, and the prism sheet need no longer be used, or the number of prism sheets used may be reduced, thus providing a lightweight, low-cost backlight unit.

The transmittance adjusters may each have any shape including a rectangle, a triangle, a hexagon, a circle, and an ellipse.

Where the backlight unit uses linear light sources and a light guide plate shaped by uniaxial drawing as in the example under discussion, the transmittance adjusters may each be shaped into an elongate strip parallel to the axes of the linear light sources.

While the above embodiment uses a transparent film as an optical member on which the transmittance adjusters are provided, the present invention is not limited thereto; the transmittance adjusters may be provided on a diffusion film or a prism sheet. For example, the transmittance adjusters may be formed on the diffusion film 15a or the prism sheet 188 illustrated in FIG. 15 instead of the transparent film. This enables reduction of the number of components required and, hence, reduction of manufacturing costs.

The optical member unit may be configured not only as described above but in various other manners.

For example, the optical member unit used is preferably composed of three diffusion films and a polarization separator film placed into layers in this order from the member closest to the light exit plane 18a.

Alternatively, one may use an optical member unit composed of a diffusion film, a prism sheet, and a polarization separator film placed into layers in this order from the member closest to the light exit plane 18a, the prism sheet having formed thereon numerous prisms extending parallel to the longitudinal direction of the light exit plane 18a and juxtaposed perpendicular to the longitudinal direction of the light exit plane 18a, with their vertexes each having an angle of 90° and facing in the direction opposite from the light guide plate 18.

Alternatively, one may use an optical member unit composed of a diffusion film, a prism sheet, another diffusion film, and a polarization separator film placed into layers in this order from the member closest to the light exit plane 18a, the prism sheet having formed thereon numerous prisms extending parallel to the longitudinal direction of the light exit plane 18a and juxtaposed perpendicular to the longitudinal direction of the light exit plane 18a, with their vertexes each having an angle of 90° and facing in the direction opposite from the light guide plate 18.

Alternatively, one may use an optical member unit composed of a prism sheet, a diffusion film, and a polarization separator film placed into layers in this order from the member closest to the light exit plane 18a, the prism sheet having formed thereon numerous prisms extending parallel to the longitudinal direction of the light exit plane 18a and juxtaposed perpendicular to the longitudinal direction of the light exit plane 18a, with their vertexes each having an angle of 60° and facing the light guide plate 18.

Alternatively, one may use an optical member unit composed of a diffusion film, a first prism sheet, a second prism sheet, another diffusion film, and a polarization separator film placed into layers in this order from the member closest to the light exit plane 18a, the first prism sheet having formed thereon numerous prisms extending parallel to the longitudinal direction of the light exit plane 18a and juxtaposed perpendicular to the longitudinal direction of the light exit plane 18a, with their vertexes each having an angle of 90° and facing in the direction opposite from the light guide plate 18, the second prism sheet having formed thereon numerous prisms extending parallel to the longitudinal direction of the light exit plane 18a and juxtaposed perpendicular to the longitudinal direction of the light exit plane 18a, with their vertexes each having an angle of 90° and facing in the direction of the light guide plate 18.

The backlight unit further comprises a housing, not shown in the above embodiment, for accommodating and supporting the light sources, the optical member unit, the light guide plate, the reflection sheet, and the like. The housing has an opening formed on the side thereof closer to the light exit plane to permit emission of light through that opening.

The backlight unit preferably has cushioning members disposed in a space between the reflection sheet 22 and the housing, i.e., a space defined by the surface of the reflection sheet 22 opposite from the light guide plate 18 and the surface of the housing facing the reflection sheet 22. The cushioning members are formed of a material having a lower rigidity than the light guide plate so as to deform according to the contour of the light guide plate and may be formed, for example, of a sponge.

The cushioning members place the reflection sheet 22 in close contact with the light guide plate 18 and prevent the reflection sheet 22 from bending by supporting the reflection sheet 22 and the light guide plate 18 on the side thereof defined by the first inclined plane 18b and the second inclined plane 18c. Further, where the light guide plate support members are formed of the cushioning members, the light guide plate and the reflection sheet can be brought into intimate contact with each other evenly over the whole surface, which prevents diffuse reflection of light that would otherwise occur if only part of the reflection sheet were in contact with the light guide plate 18. This prevents otherwise diffusely reflected light from being observed as bright light as it is emitted through the light exit plane and instead makes it possible to emit uniform light through the light exit plane 18a.

FIGS. 8A to 8D are exploded sectional views illustrating examples of schematic configuration of the cushioning members supporting the light guide plate and the reflection sheet.

Figure 8A:
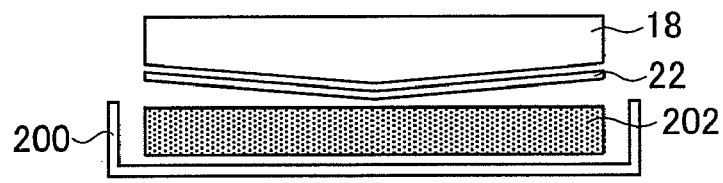
FIGS. 8A to 8D are exploded views illustrating examples of schematic configurations of cushioning members and a housing for supporting the light guide plate and a reflection sheet.

As illustrated in FIG. 8A, a rectangular cushioning member 202 may for example be provided between the reflection sheet 22 and a housing 200. The cushioning member 202 is preferably formed of a material having a maximum stress of 5 [N/cm2] or less.

Figure 8B:
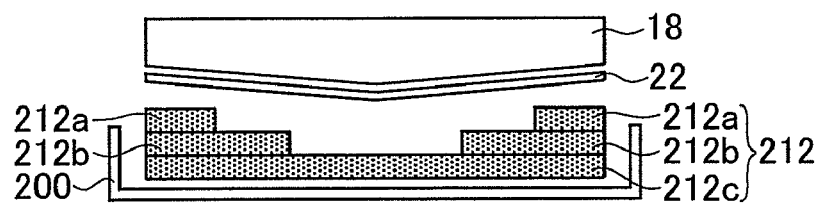

As illustrated in FIG. 8B, a multilayer cushioning member 212 consisting of cushioning pieces 212a, 212b, and 212c, may be provided between the reflection sheet 22 and a housing 200 so as to vary in thickness according to the shape of the light guide plate 18. Providing the cushioning member 212 that varies in thickness serves to reduce the compressibility of the cushioning member and reduce the maximum stress that acts on the light guide plate. Thus, the force acts on the light guide plate evenly over the whole surface, bringing the light guide plate and the reflection sheet evenly into close contact.

Figure 8C:
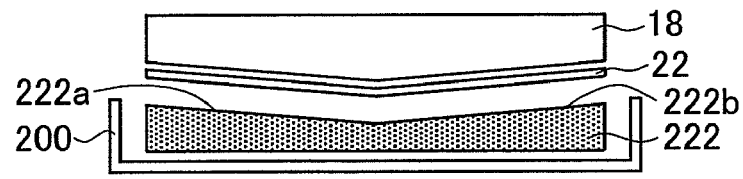

Alternatively, a cushioning member 222 may have a shape contouring the inclined planes of the light guide plate 18, as illustrated in FIG. 8C. That is, the cushioning member 222 has a shape formed of a first inclined plane 222a and a second inclined plane 222b with the same inclination angle as the first inclined plane and the second inclined plane of the light guide plate 18 on the side closer to the light guide plate 18.

Thus, the light guide plate and the reflection sheet can be placed in close contact with each other evenly over the whole surface by forming the cushioning member so as to contour the inclined planes of the light guide plate.

Figure 8D:
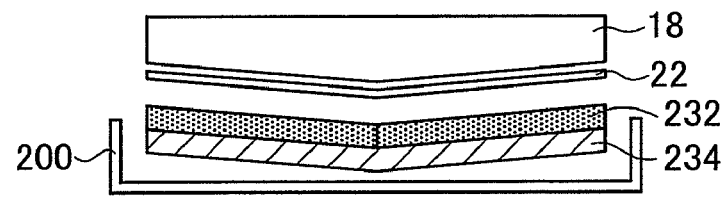
Figure 9:
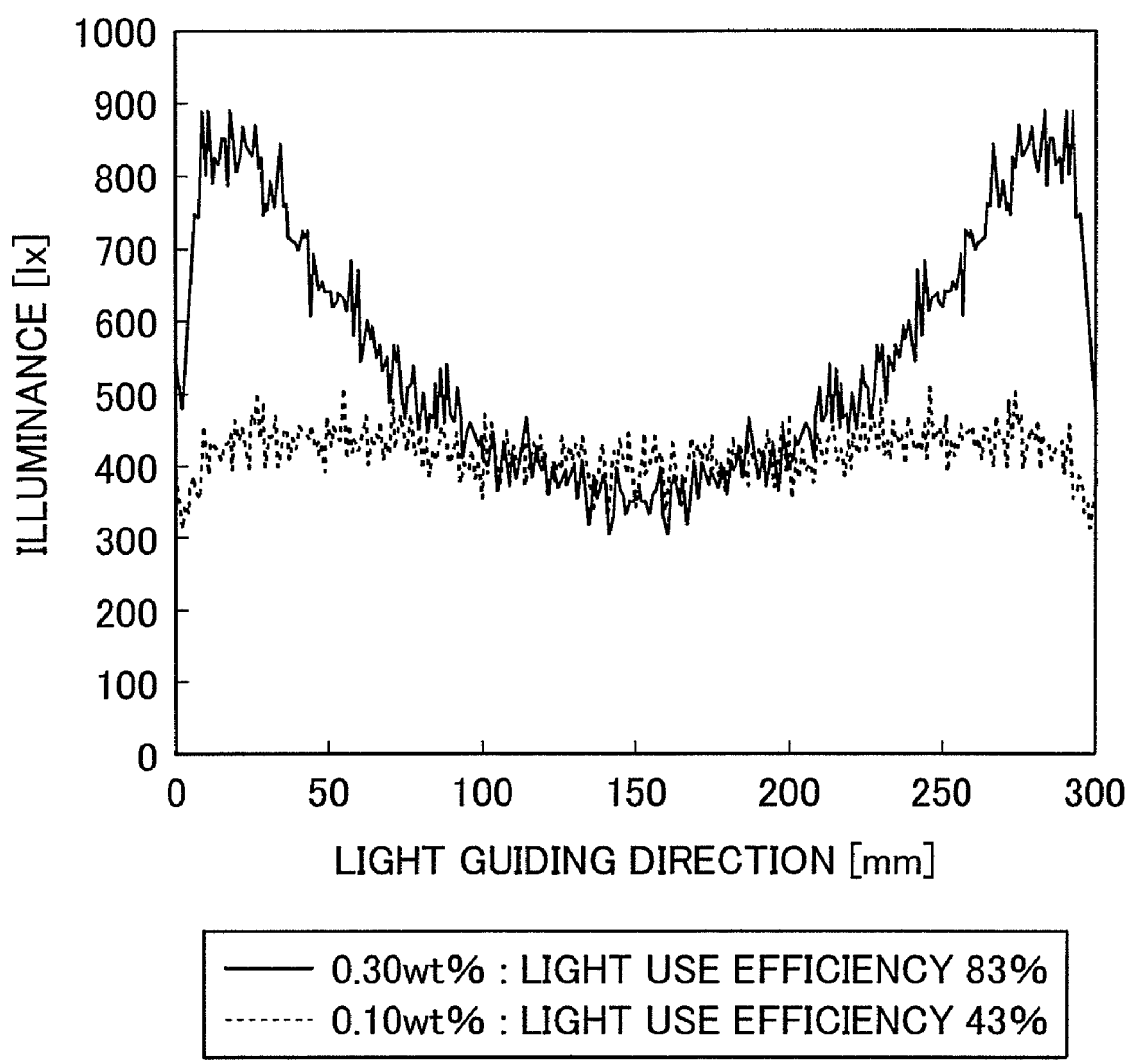
FIG. 9 is a graph illustrating an illuminance distribution of a conventional light guide plate as observed from the front thereof.

Alternatively, a cushioning member 232 having a shape contouring the inclined planes of the light guide plate 18 may be provided together with a sheet metal 234 contouring the inclined planes of the light guide plate 18 on the side of the cushioning member 232 opposite from the light guide plate 18, as illustrated in FIG. 8D. In this embodiment, the housing 200 and the sheet metal 234 together form a housing.

Providing the sheet metal 234 contouring the inclined planes of the light guide plate 18 on the side of the cushioning member 232 opposite from the light guide plate 18 gives a uniform compressibility to the cushioning member throughout. Further, supporting the reflection sheet via the cushioning member brings the light guide plate and the reflection sheet into close contact with each other.

The housing 200 and the sheet metal 234 may be provided in one piece or as discrete components.

While the inventive light guide plate, the light guide plate unit, and the planar lighting device using them have been described above in detail, the present invention is not limited to the above embodiments, and various improvements and modifications may be made without departing from the spirit of the present invention.

EXAMPLES

Now, the present invention will be described specifically based upon examples.

In the measurements of the examples, the light sources 12 and the light guide plate 18 each having a configuration illustrated in FIGS. 2A and 2B were used to find the light use efficiency [%] indicating the ratio of the light emitted through the light exit plane 18a to the light admitted through the two light entrance planes 18d and 18e and the brightness distribution of the light emitted through the light exit plane 18a in order to obtain the middle-high ratio [%] expressed by the brightness distribution observed at the light exit plane 18a indicating the ratio of brightness of the light emitted from an area about the center of the light exit plane 18a to the light emitted at the periphery, i.e., areas close to the light entrance planes 18d and 18e, by varying the light guiding length [mm], the shape, i.e., the maximum thickness [mm], the minimum thickness [mm], the taper [degree], and the radius of curvature R of the central curved portion of the light guide plate 18, and the particle diameter [μm] and the particle density [wt %] of the scattering particles dispersed in the light guide plate 18.

Example 1

In Example 1, a light guide plate 18 having a light guiding length L of 480 mm for a screen size of 37 inches was used to obtain the taper [degree], the radius of curvature R of the central portion (curved portion) [mm], the light use efficiency [%], and the middle-high ratio [%] by varying the maximum thickness [mm], the minimum thickness [mm], the particle diameter [μm], and the particle density [wt %] as shown in Tables 2 and 3. Tables 2 and 3 show the results.

Table 2 shows examples 11 to 16 according to the invention related to Example 1; Table 3 shows Comparative Examples 11 to 16 related to Example 1.

TABLE 2

| | Example 1 | | | | | |
|---|---|---|---|---|---|---|
| | Examples according to the invention | | | | | |
| | 11 | 12 | 13 | 14 | 15 | 16 |
| Screen size | 37" | 37" | 37" | 37" | 37" | 37" |
| Light guiding length [mm] | 480 | 480 | 480 | 480 | 480 | 480 |
| Maximum thickness [mm] | 3.48 | 1.49 | 3.51 | 3.48 | 3.48 | 3.48 |
| Minimum thickness [mm] | 2 | 0.5 | 1 | 2 | 2 | 2 |
| Particle diameter [μm] | 7 | 7 | 7 | 4.5 | 9 | 12 |
| Particle density [wt %] | 0.065 | 0.049 | 0.097 | 0.047 | 0.084 | 0.122 |

TABLE 2-continued

Example 1

Examples according to the invention

| | 11 | 12 | 13 | 14 | 15 | 16 |
|---|---|---|---|---|---|---|
| Taper [deg.] | 0.477 | 0.358 | 0.716 | 0.477 | 0.477 | 0.477 |
| Central portion R [mm] | 15000 | 27000 | 7000 | 15000 | 15000 | 15000 |
| Light use efficiency [%] | 61.5 | 63 | 65 | 61.2 | 61.6 | 61.5 |
| Middle-high ratio [%] | 19 | 22 | 23 | 19 | 19.2 | 19.2 |

TABLE 3

Comparative Example

Comparative examples

| | 11 | 12 | 13 | 14 | 15 | 16 |
|---|---|---|---|---|---|---|
| Screen size | 37" | 37" | 37" | 37" | 37" | 37" |
| Light guiding length [mm] | 480 | 480 | 480 | 480 | 480 | 480 |
| Maximum thickness [mm] | 3.48 | 6.48 | 1.2 | 1.45 | 3.48 | 3.48 |
| Minimum thickness [mm] | 2 | 5 | 1 | 1 | 2 | 2 |
| Particle diameter [μm] | 7 | 7 | 7 | 7 | 2 | 15 |
| Particle density [wt %] | 0.25 | 0.065 | 0.25 | 0.032 | 0.035 | 0.178 |
| Taper [deg.] | 0.477 | 0.477 | 0.095 | 0.233 | 0.477 | 0.477 |
| Central portion R [mm] | 15000 | 15000 | 144000 | 57000 | 15000 | 15000 |
| Light use efficiency [%] | 62 | 50 | 62 | 52 | 63 | 51 |
| Middle-high ratio [%] | −6.1 | 5 | −15 | 8 | −8 | 9 |

As will be apparent from Tables 2 and 3, the particle diameter [μm] and the particle density [wt %] of Examples 11 to 16 according to the invention are all within the limited ranges as set according to the invention as are the maximum thickness [mm] and the minimum thickness [mm]. Thus, the light use efficiency [%] is greater than 61%, hence greater than 55% and the middle-high ratio [%] is in a range of 19% to 23%, meeting the range as set according to the invention, i.e., 0% exclusive to 25% inclusive.

In contrast, Comparative Example 11 fails to achieve a high-in-the-middle brightness distribution because the particle density is greater than the range as set according to the invention and, therefore, like phenomena occur as in the case of the flat light guide plate.

Comparative Example 12, having a maximum thickness [mm] and a minimum thickness [mm] both over the upper limits of 6.0 mm and 3.0 mm, respectively, allows light to pass through the light guide plate and therefore yields a light use efficiency of only 50%, failing to meet the limited range of 55% or greater. In addition, Comparative Example 12 is not suitable for use as an optical member for liquid crystal televisions because of its excessive weight.

Comparative Example 13 has a taper angle of smaller than 0.1°, which is below the limited range as set according to the invention, and the central curved portion thereof has an excessively great radius of curvature R no longer suitable for molding. In addition, Comparative Example 13 fails to achieve a high-in-the-middle distribution at a particle density yielding a light use efficiency of 55% or greater.

Comparative Example 14, comparable to a flat plate, has an excessively great radius of curvature R no longer suitable for molding and fails to yield a light use efficiency of 55% or greater at a particle density achieving a high-in-the-middle distribution.

Comparative Example 15, containing particles having a diameter below the limited range as set according to the invention, yields a high light use efficiency but fails to achieve a high-in-the-middle brightness distribution, whereas Comparative Example 16, containing particles having a diameter above the limited range as set according to the invention, achieves a high-in-the-middle brightness distribution but yields a low light use efficiency.

Example 2

In Example 2, light guide plates 18 having light guiding lengths L of 560 mm and 590 mm for screen sizes of 42 inches and 46 inches, respectively, were used to obtain the taper [degree], the radius of curvature R of the central portion (curved portion), the light use efficiency [%], and the middle-high ratio [%] by varying the maximum thickness [mm], the minimum thickness [mm], the particle diameter [μm], and the particle density [wt %] as shown in Tables 4 and 5. Tables 4 and 5 show the results.

Table 4 shows examples 21 to 24 according to the invention related to Example 2; Table 5 shows Comparative Examples 21 to 23 related to Example 2.

TABLE 4

Example 2

| | Examples according to the invention | | | |
|---|---|---|---|---|
| | 21 | 22 | 23 | 24 |
| Screen size | 42" | 46" | 42" | 46" |
| Light guiding length [mm] | 560 | 590 | 560 | 590 |
| Maximum thickness [mm] | 3.48 | 3.48 | 3.48 | 3.5 |
| Minimum thickness [mm] | 2 | 2 | 2 | 1.5 |
| Particle diameter [μm] | 7 | 7 | 12 | 7 |
| Particle density [wt %] | 0.048 | 0.043 | 0.09 | 0.054 |
| Taper [deg.] | 0.411 | 0.39 | 0.411 | 0.486 |
| Central portion R [mm] | 20000 | 22000 | 20000 | 15000 |
| Light use efficiency [%] | 61 | 61 | 61 | 59 |
| Middle-high ratio [%] | 15 | 14.5 | 15 | 14 |

TABLE 5

Comparative Example

| | Comparative Example | | |
|---|---|---|---|
| | 21 | 22 | 23 |
| Screen size | 42" | 46" | 42" |
| Light guiding length [mm] | 560 | 590 | 560 |
| Maximum thickness [mm] | 3.48 | 3.48 | 6.76 |
| Minimum thickness [mm] | 2 | 2 | 1 |
| Particle diameter [μm] | 7 | 7 | 7 |
| Particle density [wt %] | 0.148 | 0.133 | 0.085 |
| Taper [deg.] | 0.411 | 0.39 | 1.228 |
| Central portion R [mm] | 20000 | 22000 | 3500 |
| Light use efficiency [%] | 63 | 63 | 58 |
| Middle-high ratio [%] | −8.5 | −9.5 | 29 |

As will be apparent from Tables 4 and 5, the particle diameter [μm] and the particle density [wt %] of Examples 21 to 24 according to the invention are all within the limited ranges as set according to the invention as are the maximum thickness [mm] and the minimum thickness [mm]. Thus, the light use efficiency [%] is in a range of 59% to 61%, hence greater than 55%, in all the examples according to the invention, and the middle-high ratio [%] is in a range of 14% to 15%, meeting the range as set according to the invention, i.e., 0% exclusive to 25% inclusive.

In contrast, Comparative Examples 21 and 22 fail to achieve a high-in-the-middle brightness distribution because the particle density is greater than the range as set according to the invention and, therefore, like phenomena occur as in the case of the flat light guide plate.

Comparative Example 23, having a maximum thickness [mm] and a taper angle both over the upper limits of 6.0 mm and 0.80, respectively, such that the excessively great taper makes the maximum thickness greater than is required, resulting in not only an overly accentuated high-in-the-middle distribution curve but an excessive weight unsuitable for use as an optical member in liquid crystal televisions.

Example 3

In Example 3, light guide plates 18 having light guiding lengths L of 660 mm and 730 mm for screen sizes of 52 inches and inches, respectively, were used to obtain the taper [degree], the radius of curvature R of the central portion (curved portion), the light use efficiency [%], and the middle-high ratio [%] by varying the maximum thickness [mm], the minimum thickness [mm], the particle diameter [μm], and the particle density [wt %] as shown in Tables 6 and 7. Tables 6 and 7 show the results.

Table 6 shows examples 31 and 32 according to the invention related to Example 3; Table 7 shows Comparative Examples 31 to 35 related to Example 3.

TABLE 6

Example 3

| | Example according to the invention | |
|---|---|---|
| | 31 | 32 |
| Screen size | 52" | 57" |
| Light guiding length [mm] | 660 | 730 |
| Maximum thickness [mm] | 3.5 | 3.48 |
| Minimum thickness [mm] | 2 | 2 |
| Particle diameter [μm] | 7 | 7 |
| Particle density [wt %] | 0.035 | 0.028 |
| Taper [deg.] | 0.351 | 0.317 |
| Central portion R [mm] | 28000 | 33000 |
| Light use efficiency [%] | 60 | 61 |
| Middle-high ratio [%] | 14 | 14.2 |

TABLE 7

| | Comparative Example | | | | |
|---|---|---|---|---|---|
| | 31 | 32 | 33 | 34 | 35 |
| Screen size | 52" | 57" | 52" | 52" | 57" |
| Light guiding length [mm] | 660 | 730 | 660 | 660 | 730 |
| Maximum thickness [mm] | 3.5 | 3.48 | 5.49 | 2.15 | 3.24 |
| Minimum thickness [mm] | 2 | 2 | 0.5 | 1.9 | 3 |
| Particle diameter [μm] | 7 | 7 | 7 | 7 | 7 |
| Particle density [wt %] | 0.107 | 0.008 | 0.045 | 0.02 | 0.0015 |
| Taper [deg.] | 0.351 | 0.317 | 0.955 | 0.087 | 0.078 |
| Central portion R [mm] | 28000 | 33000 | 3800 | 220000 | 260000 |
| Light use efficiency [%] | 63 | 42 | 59 | 61 | 42 |
| Middle-high ratio [%] | −11.2 | 11 | 30 | −8 | 56 |

As will be apparent from Tables 6 and 7, the particle diameter [μm] and the particle density [wt %] of Examples 31 to 32 according to the invention are all within the limited ranges as set according to the invention as are the maximum thickness [mm] and the minimum thickness [mm]. Thus, the light use efficiency [%] is in a range of 60% to 61%, hence greater than 55%, in all the examples, and the middle-high ratio [%] is in a range of 14% to 14.2%, meeting the range as set according to the invention, i.e., 0% exclusive to 25% inclusive.

In contrast, Comparative Example 31 fails to achieve a high-in-the-middle brightness distribution because the particle density is greater than the range as set according to the invention and, therefore, like phenomena occur as in the case of the flat light guide plate.

Comparative Example 32 has a particle density lower than the limited range as set according to the invention, allowing light to pass through the light guide plate, and therefore fails to yield a light use efficiency required to be at least 55%.

Comparative Example 33 has a taper angle exceeding the upper limit 0.8° of the limited range as set according to the invention and exhibits an overly accentuated high-in-the-middle distribution curve.

Comparative Examples 34 and 35 have a taper angle below the lower limit 0.1 of the limited range as set according to the invention, making the radius of curvature R of the central curved portion excessively great and hence unsuitable for molding. Comparative Example 34 fails to achieve a high-in-the-middle distribution at a particle density yielding a light use efficiency of 55% or greater. Comparative Example 35, comparable to a flat plate, fails to yield a light use efficiency of 55% or greater at a particle density achieving a high-in-the-middle distribution.

Example 4

In Example 4, light guide plates 18 having light guiding lengths L of 660 mm and 730 mm for screen sizes of 52 inches and 57 inches, respectively, were used to obtain the taper [degree], the radius of curvature R of the central portion (curved portion), the light use efficiency [%], and the middle-high ratio [%] by varying the maximum thickness [mm], the minimum thickness [mm], the particle diameter [μm], and the particle density [wt %] as shown in Tables 8 and 9. Tables 8 and 9 show the results.

Table 8 shows examples 41 and 44 according to the invention related to Example 4; Table 9 shows Comparative Examples 41 to 45 related to Example 4.

TABLE 8

| | Example 4 | | | |
|---|---|---|---|---|
| | Example according to the invention | | | |
| | 21 | 22 | 23 | 24 |
| Screen size | 42" | 46" | 42" | 46" |
| Light guiding length [mm] | 560 | 590 | 560 | 590 |
| Maximum thickness [mm] | 3.48 | 3.48 | 3.48 | 3.5 |
| Minimum thickness [mm] | 2 | 2 | 2 | 1.5 |
| Particle diameter [μm] | 7 | 7 | 12 | 7 |
| Particle density [wt %] | 0.048 | 0.043 | 0.09 | 0.054 |
| Taper [deg.] | 0.411 | 0.39 | 0.411 | 0.486 |
| Central portion R [mm] | 20000 | 22000 | 20000 | 15000 |
| Light use efficiency [%] | 61 | 61 | 61 | 59 |
| Middle-high ratio [%] | 15 | 14.5 | 15 | 14 |

TABLE 9

| | Comparative Example | | |
|---|---|---|---|
| | Comparative example | | |
| | 21 | 22 | 23 |
| Screen size | 42" | 46" | 42" |
| Light guiding length [mm] | 560 | 590 | 560 |
| Maximum thickness [mm] | 3.48 | 3.48 | 6.76 |
| Minimum thickness [mm] | 2 | 2 | 1 |
| Particle diameter [μm] | 7 | 7 | 7 |
| Particle density [wt %] | 0.148 | 0.133 | 0.085 |
| Taper [deg.] | 0.411 | 0.39 | 1.228 |
| Central portion R [mm] | 20000 | 22000 | 3500 |
| Light use efficiency [%] | 63 | 63 | 58 |
| Middle-high ratio [%] | −8.5 | −9.5 | 29 |

As will be apparent from Tables 8 and 9, the particle diameter [μm] and the particle density [wt %] of Examples 41 to 44 according to the invention are all within the limited ranges as set according to the invention as are the maximum thickness [mm] and the minimum thickness [mm]. Thus, the light use efficiency [%] is in a range of 57% to 68%, hence greater than 55%, in all the examples, and the middle-high ratio [%] is in a range of 11% to 24%, meeting the range as set according to the invention, i.e., 0% exclusive to 25% inclusive.

In contrast, Comparative Example 41 has a particle density below the limited range as set according to the invention, allowing light to pass through the light guide plate, and therefore fails to meet the condition for the light use efficiency, which is required to be at least 55%.

Comparative Example 42 has a maximum thickness [mm] and a minimum thickness both over the upper limits of 6.0 mm and 3.0 mm, respectively, and therefore allows light to pass through the light guide plate, resulting in a low light use efficiency of 50%, which fails to meet the condition of 55% or greater, and an excessive weight unsuitable for use as an optical member in liquid crystal televisions.

Comparative Example 43 has a maximum thickness [mm] less than the lower limit 1.0 mm of the limited range as set according to the invention, making the radius of curvature R of the central curved portion excessively great beyond the limited range as set according to the invention and hence unsuitable for molding and fails to achieve a high-in-the-middle distribution at a particle density yielding a light use efficiency of 55% or greater.

Comparative Example 44, containing particles having a diameter below the limited range as set according to the invention, yields a high light use efficiency but fails to achieve a high-in-the-middle brightness distribution whereas Comparative Example 45, containing particles having a diameter over the limited range as set according to the invention, achieves a high-in-the-middle brightness distribution but yields only a low light use efficiency.

The results described above will show that all the examples according to the invention have an appropriate shape for each range of the light guiding length of the light guide plate; have a maximum thickness [mm], a minimum thickness [mm], a taper [degree], a radius of curvature R of the central curved portion, and a particle diameter [μm] and a particle density [wt %] of the scattering particles dispersed in the light guide plate all meeting the limited ranges as set according to the invention; yield a light use efficiency [%] of 55% or greater; and achieve the middle-high ratio [%] in the range of 0% exclusive to 25% inclusive. Thus, all the examples according to the invention possess excellent properties.

In contrast, all the Comparative Examples fail to meet the limited range of at least one of the above conditions as set according to the invention, failing to meet the condition for the light use efficiency [%], which is required to be 55% or greater, nor do they meet the condition for the middle-high ratio [%], which is required to be in the range of 0% exclusive to 25% inclusive. Thus, the above Comparative Examples all fail to exhibit excellent properties.

The effects of the present invention will be apparent from the above description.

What is claimed is:

1. A light guide plate comprising:
   a light exit plane being flat and rectangular;
   two light entrance planes respectively containing two opposite longer sides of said light exit plane and disposed opposite each other;
   two inclined rear planes being symmetrical and increasingly distanced from said light exit plane from said two light entrance planes toward a center of said light exit plane;
   a curved portion joining said two inclined rear planes; and
   scattering particles for scattering light travelling inside said light guide plate contained in said light guide plate,
   wherein a light guiding length between said two light entrance planes ranges from 480 mm to 500 mm both inclusive,
   wherein a particle diameter of said scattering particles ranges from 4.0 μm to 12.0 μm both inclusive and a particle density of said scattering particles ranges from 0.02 wt % to 0.22 wt % both inclusive;
   wherein said particle diameter and said particle density of said scattering particles are within an area determined by six points (4.0,0.02), (4.0,0.085), (7.0,0.03), (7.0,0.12), (12.0,0.06), and (12.0,0.22) in a graph where a horizontal axis indicates said particle diameter [μm] of said scattering particles and a vertical axis indicates said particle density [wt %] of said scattering particles;
   wherein a light use efficiency indicating a ratio of light emitted through said light exit plane to light admitted through said two light entrance planes is 55% or greater; and
   wherein a middle-high ratio represented by a brightness distribution at said light exit plane indicating a ratio of brightness of light emitted from an area about a center of said light exit plane to the brightness of light emitted at areas of said light exit plane close to said light entrance planes is above 0% and not greater than 25%.

2. The light guide plate according to claim 1,
   wherein a thickness that is a distance from said light exit plane in a direction perpendicular to said light exit plane is 0.5 mm to 3.0 mm both inclusive at said light exit planes where said thickness is smallest,
   wherein said thickness is 1.0 mm to 6.0 mm both inclusive at a center of said curved portion where said thickness is greatest,
   wherein a radius of curvature of said curved portion is 6,000 mm to 45,000 mm both inclusive, and
   wherein a taper of said inclined rear planes is 0.1° to 0.8° both inclusive.

3. The light guide plate according to claim 1, wherein said light entrance planes each have a surface roughness of less than 380 nm.

4. A light guide plate unit comprising:
a light guide plate according to claim 1: and
an optical member unit provided closer to said light exit plane of said light guide plate and including at least one diffusion film having a diffusion function of admitting and diffusing light emitted through said the light exit plane.

5. The light guide plate unit according to claim 4,
wherein said optical member unit comprises:
three diffusion films that said at least one diffusion film includes; and
a polarization separator film having a polarized light separating function whereby light polarized in a given direction is separated from incoming light and transmitted, and
wherein said three diffusion films and said polarization separator film are placed in layers in an order from said light exit plane of said light guide plate.

6. The light guide plate unit according to claim 4,
wherein said optical member unit comprises:
a diffusion film that said at least one diffusion film includes;
a prism sheet formed with a number of prisms extending parallel to a longitudinal direction of said light exit plane and juxtaposed perpendicular to the longitudinal direction of said light exit plane, with their vertexes each having an angle of 90° and facing in a direction opposite from said light guide plate; and
a polarization separator film having a polarized light separating function whereby light polarized in a given direction is separated from incoming light and transmitted, and
wherein said diffusion film, said prism sheet and said polarization separator film are placed in layers in an order from said light exit plane of said light guide plate.

7. The light guide plate unit according to claim 4,
wherein the optical member unit comprises:
a first diffusion film that said at least one diffusion film includes;
a prism sheet formed with a number of prisms extending parallel to a longitudinal direction of said light exit plane and juxtaposed perpendicular to the longitudinal direction of said light exit plane, with their vertexes each having an angle of 90° and facing in a direction opposite from said light guide plate;
a second diffusion film that said at least one diffusion film includes; and
a polarization separator film having a polarized light separating function whereby light polarized in a given direction is separated from incoming light and transmitted, and
wherein said first diffusion film, said prism sheet, said second diffusion film and said polarization separator film are placed in layers in an order from said light exit plane of said light guide plate.

8. The light guide plate unit according to claim 4,
wherein the optical member unit comprises:
a prism sheet formed with a number of prisms extending parallel to a longitudinal direction of said light exit plane and juxtaposed perpendicular to the longitudinal direction of the light exit plane, with their vertexes each having an angle of 60° and facing in a direction of said light guide plate;
a diffusion film that said at least one diffusion film includes; and
a polarization separator film having a polarized light separating function whereby light polarized in a given direction is separated from incoming light and transmitted, and
wherein said prism sheet, said diffusion film and said polarization separator film are placed in layers in an order from said light exit plane of said light guide plate.

9. The light guide plate unit according to claim 4,
wherein the optical member unit comprises:
a first diffusion film that said at least one diffusion film includes;
a first prism sheet formed with a number of prisms extending parallel to a longitudinal direction of said light exit plane and juxtaposed perpendicular to the longitudinal direction of said light exit plane, with their vertexes each having an angle of 90° and facing in a direction opposite from said light guide plate;
a second prism sheet formed with a number of prisms extending parallel to a longitudinal direction of said light exit plane and juxtaposed perpendicular to the longitudinal direction of said light exit plane, with their vertexes each having an angle of 90° and facing in a direction of said light guide plate;
a second diffusion film that said at least one diffusion film includes; and
a polarization separator film having a polarized light separating function whereby light polarized in a given direction is separated from incoming light and transmitted, and
wherein said first diffusion film, said first prism sheet, said second prism sheet, said second diffusion film and said polarization separator film are placed in layers in an order from said light exit plane of said light guide plate.

10. The light guide plate unit according to claim 4, further comprising: a reflection sheet disposed in contact with said two inclined rear planes and said curved portion of said light guide plate.

11. A light guide plate unit comprising:
a light guide plate according to claim 1; and
a reflection sheet disposed in contact with said two inclined rear planes and said curved portion of said light guide plate.

12. A planar lighting device comprising:
a light guide plate according to claim 1; and
two light sources disposed opposite said two light entrance planes of said light guide plate, respectively.

13. The planar lighting device according to claim 12, further comprising:
a housing for supporting said light guide plate or said light guide plate and said reflection sheet from said inclined rear planes of said light guide plate; and
a cushioning member disposed between said light guide plate and said housing or between said reflection sheet and said housing such that said cushioning member supports said light guide plate or said light guide plate and said reflection sheet and is supported by said housing.

14. The planar lighting device according to claim 12,
wherein each of said light sources comprise: plural LED chips; and a support for supporting said plural LED chips, and wherein said plural LED chips are arrayed on a plane of said support opposite to each of said two light entrance planes.

15. The planar lighting device according to claim 14,
wherein each of said plural LED chips comprises: an LED for emitting light having a blue wavelength; and a yellow fluorescent substance disposed on a light exit surface of said LED.

16. The planar lighting device according to claim 14,
wherein each of said plural LED chips comprises: an LED for emitting light having a blue wavelength; a red fluorescent substance disposed on a light exit surface of the LED; and a green fluorescent substance disposed on said light exit surface of said LED.

17. The planar lighting device according to claim 14, wherein each of said plural LED chips comprises: an LED for emitting light having a blue wavelength; an LED for emitting light having a green wavelength, and an LED for emitting light having a red wavelength.

18. A light guide plate comprising:
a light exit plane being flat and rectangular;
two light entrance planes respectively containing two opposite longer sides of said light exit plane and disposed opposite each other;
two inclined rear planes being symmetrical and increasingly distanced from said light exit plane from said two light entrance planes toward a center of said light exit plane;
a curved portion joining said two inclined rear planes; and
scattering particles for scattering light travelling inside said light guide plate contained in said light guide plate,
wherein a light guiding length between said two light entrance planes ranges from 515 mm to 620 mm both inclusive,
wherein a particle diameter of said scattering particles ranges from 4.0 μm to 12.0 μm both inclusive and a particle density of said scattering particles ranges from 0.015 wt % to 0.16 wt % both inclusive;
wherein said particle diameter and said particle density of said scattering particles are within an area determined by six points (4.0,0.015), (4.0,0.065), (7.0,0.02), (7.0,0.09), (12.0,0.035), and (12.0,0.16) in a graph where a horizontal axis indicates said particle diameter [μm] of said scattering particles and a vertical axis indicates said particle density [wt %] of said scattering particles;
wherein a light use efficiency indicating a ratio of light emitted through said light exit plane to light admitted through said two light entrance planes is 55% or greater; and
wherein a middle-high ratio represented by a brightness distribution at said light exit plane indicating a ratio of brightness of light emitted from an area about a center of said light exit plane to the brightness of light emitted at areas of said light exit plane close to said light entrance planes is above 0% and not greater than 25%.

19. A light guide plate comprising:
a light exit plane being flat and rectangular;
two light entrance planes respectively containing two opposite longer sides of said light exit plane and disposed opposite each other;
two inclined rear planes being symmetrical and increasingly distanced from said light exit plane from said two light entrance planes toward a center of said light exit plane;
a curved portion joining said two inclined rear planes; and
scattering particles for scattering light travelling inside said light guide plate contained in said light guide plate,
wherein a light guiding length between said two light entrance planes ranges from 625 mm to 770 mm both inclusive,
wherein a particle diameter of said scattering particles ranges from 4.0 μm to 12.0 μm both inclusive and a particle density of said scattering particles ranges from 0.01 wt % to 0.12 wt % both inclusive;
wherein said particle diameter and said particle density of said scattering particles are within an area determined by six points (4.0,0.01), (4.0,0.05), (7.0,0.01), (7.0,0.06), (12.0,0.02), and (12.0,0.12) in a graph where a horizontal axis indicates said particle diameter [μm] of said scattering particles and a vertical axis indicates said particle density [wt %] of said scattering particles;
wherein a light use efficiency indicating a ratio of light emitted through said light exit plane to light admitted through said two light entrance planes is 55% or greater; and
wherein a middle-high ratio represented by a brightness distribution at said light exit plane indicating a ratio of brightness of light emitted from an area about a center of said light exit plane to the brightness of light emitted at areas of said light exit plane close to said light entrance planes is above 0% and not greater than 25%.

20. A light guide plate comprising:
a light exit plane being flat and rectangular;
two light entrance planes respectively containing two opposite longer sides of said light exit plane and disposed opposite each other;
two inclined rear planes being symmetrical and increasingly distanced from said light exit plane from said two light entrance planes toward a center of said light exit plane;
a curved portion joining said two inclined rear planes; and
scattering particles for scattering light travelling inside said light guide plate contained in said light guide plate,
wherein a light guiding length between said two light entrance planes ranges from 785 mm to 830 mm both inclusive,
wherein a particle diameter of said scattering particles ranges from 4.0 μm to 12.0 μm both inclusive and a particle density of said scattering particles ranges from 0.008 wt % to 0.08 wt % both inclusive;
wherein said particle diameter and said particle density of said scattering particles are within an area determined by six points (4.0,0.008), (4.0,0.03), (7.0,0.009), (7.0,0.04), (12.0,0.02), and (12.0,0.08) in a graph where a horizontal axis indicates said particle diameter [μm] of said scattering particles and a vertical axis indicates said particle density [wt %] of said scattering particles;
wherein a light use efficiency indicating a ratio of light emitted through said light exit plane to light admitted through said two light entrance planes is 55% or greater; and
wherein a middle-high ratio represented by a brightness distribution at said light exit plane indicating a ratio of brightness of light emitted from an area about a center of said light exit plane to the brightness of light emitted at areas of said light exit plane close to said light entrance planes is above 0% and not greater than 25%.

* * * * *